United States Patent [19]

Hara et al.

[11] Patent Number: 5,489,634
[45] Date of Patent: Feb. 6, 1996

[54] METHOD FOR PRODUCING A STEREOSPECIFIC POLYOLEFIN

[75] Inventors: Daiji Hara; Morihiko Sato, both of Yokkaichi; Mitsuhiro Mori, Aichi, all of Japan

[73] Assignee: Tosoh Corporation, Shinnanyo, Japan

[21] Appl. No.: 281,134

[22] Filed: Jul. 27, 1994

Related U.S. Application Data

[63] Continuation of Ser. No. 929,022, Aug. 13, 1992, abandoned.

[30] Foreign Application Priority Data

| Sep. 5, 1991 | [JP] | Japan | 3-252841 |
| Oct. 23, 1991 | [JP] | Japan | 3-302588 |
| Oct. 31, 1991 | [JP] | Japan | 3-311358 |
| Nov. 25, 1991 | [JP] | Japan | 3-334534 |

[51] Int. Cl.$^6$ .................... C08F 4/651; C08F 4/654; C08F 10/00
[52] U.S. Cl. .................... 526/119; 502/116; 526/351; 526/904; 526/124.8
[58] Field of Search .................... 526/119

[56] References Cited

U.S. PATENT DOCUMENTS

| 3,901,863 | 8/1975 | Berger et al. | 526/116 |
| 4,321,347 | 3/1982 | Beach et al. | 526/351 |
| 4,500,682 | 2/1985 | Chiba et al. | 526/351 |
| 4,673,719 | 6/1987 | Kioka et al. | 526/125 |
| 4,780,443 | 10/1988 | Matsuura et al. | 526/904 |
| 4,829,038 | 5/1989 | Hoppin et al. | 526/351 |
| 5,032,563 | 7/1991 | Matsuura et al. | 526/128 |
| 5,053,467 | 10/1991 | Kondo et al. | 526/124 |
| 5,112,927 | 5/1992 | Hara et al. | |
| 5,141,994 | 8/1992 | Kakugo et al. | 526/351 |
| 5,229,476 | 7/1993 | Hara et al. | |
| 5,244,989 | 9/1993 | Hara et al. | |

FOREIGN PATENT DOCUMENTS

| 0230707 | 8/1987 | European Pat. Off. . |
| 0275317 | 7/1988 | European Pat. Off. . |
| 0475134 | 3/1992 | European Pat. Off. . |

*Primary Examiner*—Edward J. Smith
*Attorney, Agent, or Firm*—Oblon, Spivak, McClelland, Maier, & Neustadt

[57] ABSTRACT

A method for producing a stereospecific polyolefin in the presence of a catalyst comprising a transition metal compound and an organometallic compound, wherein a catalyst system is used which comprises (A) a solid catalyst component prepared by reacting a homogeneous solution containing (i) at least one member selected from the group consisting of metal magnesium and a hydroxylated organic compound, and oxygen-containing organic compounds of magnesium, (ii) an oxygen-containing organic compound of aluminum and (iii) an oxygen-containing organic compound of titanium, with (iv) at least one aluminum halide compound to obtain a solid product, and further reacting to this solid product, (v) an electron-donative compound and (vi) a titanium halide compound, (B) at least one member selected from the group consisting of organometallic compounds of Groups IA, IIA, IIB, IIIB and IVB of the Periodic Table, and (C) an oxygen-containing organic compound of silicon which has no aromatic substituent and which has at least one hydrocarbon group containing a secondary or tertiary carbon directly bonded to a silicon atom.

2 Claims, No Drawings

METHOD FOR PRODUCING A STEREOSPECIFIC POLYOLEFIN

This application is a continuation of application Ser. No. 07/929,022, filed on Aug. 13, 1992, now abandoned.

This invention relates to a method for producing a stereospecific polyolefin. More particularly, this invention relates to a method which is capable of producing a highly stereospecific polymer having a good configuration of particles and controlled molecular weight and molecular weight distribution in good yield by using a specific catalyst in the (co)polymerization of an α-olefin having at least three carbon atoms.

Heretofore, as a catalyst for polymerization of olefins, α-type titanium trichloride obtained by reducing titanium tetrachloride with hydrogen, purple γ-type titanium trichloride obtained by reducing titanium tetrachloride with aluminum or δ-type titanium trichloride obtained by pulverizing such titanium trichloride by a ball mil, has been known. Further, as a method for modifying such catalysts, it is known to subject them to mixing and pulverizing treatment together with various modifying agents. However, when such catalysts were used for polymerization, the polymerization activities were low, and the catalyst residues in the resulting polymers were substantial, whereby a so-called deashing step was necessary.

Further, in recent years, many proposals have been made for the production of a solid catalyst component composed essentially of magnesium, titanium and halogen. However, in many of them, further improvements are desired with respect to the catalytic activities or the stereospecificity, powder properties, etc of the polymers. Particularly, when the catalytic activities are low, odors due to electron donors added to the polymerization system or due to by-products originated therefrom may sometimes bring about problems. For example, when an aromatic compound such as phenyltriethoxysilane or ethyl benzoate is added to the polymerization system as an electron-donative compound of the catalyst component, the resulting powder will have a problem of an odor due to the aromatic group, and the presence of the aromatic compound in the resulting powder may per se sometimes be a problem.

The present inventors have previously proposed methods for obtaining stereospecific polyolefins in good yield by means of certain specific solid catalyst components comprising magnesium, titanium and halogen as the main components in Japanese Unexamined Patent Publications No. 3007/1988, No. 314210/1988, No. 317502/1988, No. 105/1989 and No. 165608/1989. In these methods, a catalyst component excellent in the catalytic activities and in the stereospecificity and the particle configuration of the polymer, is obtained by reacting a reaction product of a homogeneous solution containing Mg, Ti and an electron-donative compound and an aluminum halide compound, with a titanium halide and an electron-donative compound. However, when such catalysts are used in these methods, the controllable range of the particle size of the polymer particles has been limited to a level of at most 1,500 μm, and these methods are sometimes inapplicable to a case where a large particle size polymer is needed so that pelletizing may be omitted.

Further, a conventional magnesium halide-carrying type catalyst has higher catalytic activities and presents higher stereospecificity of the resulting polymer than the titanium trichloride type catalyst, but the molecular weight distribution of the resulting polymer is narrow, and formation of a high molecular weight polymer is not adequate. Thus, further improvements are desired. For the polymerization of α-olefin by a gas phase method, a number of proposals have been made with respect to the use of an organic aluminum compound, an oxygen-containing organic compound of silicon, and a magnesium halide-carrying type catalyst containing a carboxylate. In Japanese Unexamined Patent Publication No. 83006/1983, No. 11706/1987, No. 92615/1988, No. 283703/1990, etc., oxygen-containing organic compounds of silicon having specific molecular structures are used, to obtain polymers having very high stereospecificity. However, these catalyst systems are still insufficient for the production of a high molecular weight polymer or a polymer having a high stereospecificity and a wide molecular weight distribution in good yield, and further improvements are desired.

It is an object of the present invention to overcome the drawbacks of the conventional methods; i.e. to produce polymer particles free from an odor and with the particle size controllable within a wide range, and to produce polymer particles with such a high stereospecificity and a wide molecular weight distribution, or polymer particles having a high molecular weight component that can not be produced by the conventional magnesium-halide carrying type catalyst, in good yield and to have good powder properties. It is another object of the present invention to provide a method which is capable of producing with a wide controllable particle size range, in order to obtain a polymer having a high stiffness by a process which requires no extraction or deashing step.

As a result, the present inventors have found that the above object can be attained by using a solid catalyst component comprising the following specific Mg, Ti, Cl and electron-donative compounds as essential components and an oxygen-containing organic compound of silicon having the following specific molecular structure. The present invention has been accomplished on the basis of this discovery. The present invention provides a method for producing a stereospecific polyolefin polymer particles which are free from an odor due to an aromatic compound added to the polymerization system, or due to by-products derived therefrom, in the presence of a catalyst comprising a transition metal compound and an organometallic compound, wherein a catalyst system is used which comprises:

(A) a solid catalyst component prepared by reacting a homogeneous solution containing
  (i) at least one member selected from the group consisting of metal magnesium and a hydroxylated organic compound, and oxygen-containing organic compounds of magnesium,
  (ii) an oxygen-containing organic compound of aluminum and
  (iii) an oxygen-containing organic compound of titanium, with
  (iv) at least one aluminum halide compound to obtain a solid product, and further reacting to this solid product
  (v) an electron-donative compound and
  (vi) a titanium halide compound, (B) at least one member selected from the group consisting of organometallic compounds of Groups IA, IIA, IIB, IIIB and IV B of the periodic Table, and (C) an oxygen-containing organic compound of silicon which has no aromatic substituent and which has at least one hydrocarbon group containing a secondary or tertiary carbon directly bonded to a silicon atom. In order to produce a high molecular weight stereospecific polyolefin, this method for producing a stereospecific polyolefin is used, wherein the oxygen-containing organic compound of silicon of component (C) is a compound of the formula t-Bu(R$^1$)Si(OR$^2$)$_2$ wherein t-Bu is a tertiary butyl group, R$^1$ is a linear hydrocarbon group having from 2 to 20 carbon atoms, and R$^2$ is a hydrocarbon group having from 1 to 5 carbon atoms.

To produce a stereospecific polyolefin having a high molecular weight and a wide molecular weight distribution, the present invention also provides a method for producing a stereospecific polyolefin in the presence of a catalyst comprising a transition metal compound and an organometallic compound, wherein a catalyst system is used which comprises:

(A) a catalyst component prepared by reacting a homogeneous solution containing
  (i) at least one member selected from the group consisting of metal magnesium and a hydroxylated organic compound, and oxygen-containing organic compounds of magnesium,
  (ii) an oxygen-containing organic compound of aluminum and
  (iii) an oxygen-containing organic compound of titanium, with
  (iv) at least one aluminum halide compound to obtain a solid product, reacting to this solid product
  (v) an electron-donative compound and
  (vi) a titanium halide compound, to obtain a solid catalyst component, and further catalytically reacting to this solid catalyst component
  (vii) at least one member selected from the group consisting of an organic aluminum compound, an organic zinc compound and an organic magnesium compound, and
  (viii) an oxygen-containing organic compound of silicon of the formula t-Bu(R$^1$)Si(OR$^2$)$_2$ wherein t-Bu is a tertiary butyl group, R$^1$ is a linear hydrocarbon group having from 2 to 20 carbon atoms, and R$^2$ is a hydrocarbon group having from 1 to 5 carbon atoms, (B) at least one member selected from the group consisting of organometallic compounds of Groups IA, IIA, IIB, IIIB and IVB of the Periodic Table, and (C) an electron-donative compound. In this method for producing a stereospecific polyolefin, the electron-donative compound of the component (C) is preferably an oxygen-containing organic compound of silicon of the formula t-Bu(R$^1$)Si(OR$^2$)$_2$ wherein t-Bu is a tertiary butyl group, R$^1$ is a linear hydrocarbon group having from 2 to 20 carbon atoms, and R$^2$ is a hydrocarbon group having from 1 to 5 carbon atoms.

Now, the present invention will be described in detail with reference to the preferred embodiments.

The solid catalyst component to be used in the present invention, can be prepared by reacting a homogeneous solution containing
  (i) at least one member selected from the group consisting of metal magnesium and a hydroxylated organic compound, and oxygen-containing organic compounds of magnesium,
  (ii) an oxygen-containing organic compound of aluminum and
  (iii) an oxygen-containing organic compound of titanium such as an alkoxide of titanium, with
  (iv) an aluminum halide compound to obtain a solid product, and further reacting to this solid product
  (v) an electron-donative compound and
  (vi) a titanium halide compound.

In the above reactant (i), when metal magnesium and a hydroxylated organic compound are used, metal magnesium can take any form such as powdery form, granular form, foil form, and ribbon form, and as the hydroxylated organic compound, alcohols and organosilanols are suitable.

As the alcohols, linear or branched aliphatic alcohols having 1 to 18 carbon atoms or alicyclic or aromatic alcohols can be used. Specific examples include methanol, ethanol, n-propanol, i-propanol, n-butanol, i-butanol, sec-butanol, t-butanol, n-hexanol, 2-ethylhexanol, n-octanol, i-octanol, n-stearyl alcohol, cyclopentanol, cyclohexanol, and ethylene glycol. Further, benzyl alcohol, phenol, cresol, xylenol, and hydroquinone may be included.

The organosilanols are those having at least one hydroxyl group and an organic group selected from an alkyl group with 1 to 12 carbon atoms, preferably 1 to 6 carbon atoms, a cycloalkyl group, an arylalkyl group, an aryl group, and an alkylaryl group. For example, trimethylsilanol, triethylsilanol, triphenylsilanol, and t-butyldimethylsilanol may be mentioned.

These hydroxylated organic compounds can be used alone or as a mixture of two or more of them.

In addition, when metal magnesium is used to prepare a solid catalyst component (A) of the present invention, for the purpose of accelerating the reaction, it is preferable to add one or more substances that will react with metal magnesium or form an adduct, e.g. polar substances such as iodine, mercuric chloride, halogenated alkyls, and organic acids.

As compounds belonging to the oxygen-containing organic compounds of magnesium, the following compounds may, for example, be mentioned: magnesium alkoxides such as magnesium methylate, magnesium ethylate, magnesium isopropylate, magnesium decanolate, magnesium methoxyethylate and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate and magnesium cresolate, and magnesium carboxylates such as magnesium acetate, magnesium stearate, magnesium benzoate, magnesium phenylacetate, magnesium adipate, magnesium sebacate, magnesium phthalate, magnesium acrylate and magnesium oleate, magnesium oxymates such as magnesium butyloxymate, magnesium dimethylglyoxymate and magnesium cyclohexyloxymate, magnesium hydroxamate salts, magnesium hydroxylamine salts such as N-nitroso-N-phenyl-hydroxylamine derivatives, magnesium enolates such as magnesium acetylacetonate, and magnesium silanolates, such as magnesium triphenyl silanolate compounds. These oxygen-containing organic magnesium compounds may be used alone or in combination as a mixture of two or more of them.

As the oxygen-containing organic compound of aluminum for the above-mentioned reactant (ii), an oxygen-containing organic compound of the formula Al(OR$^5$)$_m$X$_{3-m}$ is used. In the formula, R$^5$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group, may be mentioned. In the formula, m is a number of 0<m≦3, and X is a halogen atom.

Specific examples of the oxygen-containing organic compound of aluminum, include trimethoxy aluminum, triethoxy aluminum, tri-n-propoxy aluminum, tri-i-propoxy aluminum, tri-n-butoxy aluminum, tri-sec-butoxy aluminum, tri-tert-butoxy aluminum, tri(2-ethylhexoxy)aluminum, triphenoxy aluminum, tribenzyloxy aluminum, dichloromethoxy aluminum, chlorodimethoxy aluminum, dichloro(2-ethylhexoxy) aluminum, chlorodi(2-ethylhexoxy) aluminum, dichlorophenoxy aluminum and chlorodiphenoxy aluminum. Use of several oxygen-containing organic compounds of aluminum having different hydrocarbon groups is also included in the scope of the present invention. These oxygen-containing organic compounds of aluminum may be used alone or in combination as a mixture of two or more of them.

As the oxygen-containing organic compound for the above-mentioned reactant (iii), a compound of the formula $[O_pTi_u(OR^6)_q]_n$ is used. In this formula $R^6$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group may be mentioned. In the formula, p, q and u are numbers satisfying $p \geq 0$, $q > 0$ and $u \geq 1$ and agreeable with the valence of Ti, and n is an integer. It is particularly preferred to use an oxygen-containing organic compound of titanium wherein $o \leq p \leq 1$, $1 \leq u \leq 2$ and $1 \leq n \leq 6$.

specific examples include titanium tetramethoxide, titanium tetraethoxide, titanium tetra-n-propoxide, titanium tetra-i-propoxide, titanium tetra-n-butoxide, titanium tetra-i-butoxide, tetra(n-nonyl) titanate, tetra(2-ethylhexyl) titanate, tetracresyl titanate, and hexa-i-propoxy dititanate. Use of several oxygen-containing organic compounds of titanium having different hydrocarbon groups is included in the scope of the present invention. These oxygen-containing organic compounds of titanium may be used alone or may be used by mixing or reacting two or more of them.

As the aluminum halide compound for the above-mentioned reactant (iv), those represented by the general formula $AlR^7_aX_{3-a}$ may be used. In the formula, $R^7$ represents a hydrocarbon group having from 1 to 20 carbon atoms, X represents a halogen atom, and a is a number of $0 < a \leq 2$. It is preferable that $R^7$ is selected from a linear or branched alkyl group, an alkoxy group, a cycloalkyl group, an arylalkyl group, an aryl group and an alkylaryl group. The above aluminum halide compounds may be used alone or as a mixture of two or more of them.

Specific examples of the aluminum halide compound include, for example, ethyl aluminum dichloride, n-propylaluminum dichloride, butylaluminum dichloride, i-butylaluminum dichloride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, and diethylaluminum iodide.

As the electron-donative compound for the above-mentioned reactant (v), ethers, esters, ketones, phenols, amines, amides, imines, nitriles, phosphines, phosphites, stibines, arsines, phosphoryl amides and alcoholates may be mentioned. Among them, esters are preferred, and organic esters are most preferred. As the organic esters, mono or diester of an aromatic carboxylic acid, mono or diester of an aliphatic carboxylic acid and the like may be mentioned. Specific examples include, for example, butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, ethyl p-ethoxybenzoate, methyl p-toluate, ethyl p-toluate, ethyl p-tert butylbenzoate, ethyl p-anisate, isobutyl α-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate and dibutyl naphthalate. Such electron-donative compounds (v) may be used alone or in combination as a mixture of two or more of them.

As the titanium halide compound for the above-mentioned reactant (vi), compounds represented by the general formula $Ti(OR^8)_fX_{4-f}$ may be used. In the formula, $R^8$ represents a hydrocarbon group having 1 to 20 carbon atoms, x represents a halogen atom and f is a number of $0 \leq f < 4$. $R^8$ is preferably selected from a linear or branched alkyl group, an alkoxy group, a cycloalkyl group, an arylalkyl group, an aryl group and an alkylaryl group. The above-mentioned titanium halide compounds may be used alone or in combination as a mixture of two or more of them.

Specific examples of the titanium halide compound include, for example, titanium tetrachloride, ethoxy titanium trichloride, propoxy titanium trichloride, butoxy titanium trichloride, phenoxy titanium trichloride, diethoxy titanium dichloride, triethoxy titanium chloride, titanium tetrabromide, titanium tetraiodide and dichlorodibromo titanium.

The solid catalyst component obtainable by the present invention, can be prepared by reacting the reactant (iv) to a homogeneous solution obtained by reacting the above reactants (i), (ii) and (iii) and then reacting the reactants (v) and (vi) to the obtained solid product. These reactions are preferably conducted in a liquid medium. For this purpose, especially when these reactants are not liquid under the operational conditions or the amount of liquid reactants is inadequate, these reactions should be conducted in the presence of an inert organic solvent.

As such an inert organic solvent, any solvent commonly used in this technical field may be employed, and aliphatic, alicyclic or aromatic hydrocarbons or halogenated derivatives or mixtures thereof may be employed. For example, isobutane, pentane, isopentane, hexane, heptane, cyclohexane, benzene, toluene, xylene, chlorobenzene, 1,2-dichlorobenzene, 1,3-dichlorobenzene, benzyl chloride, methylene dichloride, 1,2-dichloroethane, 1,3-dichloropropane, 1,4-dichlorobutane, 1,1,1-trichloroethane, 1,1,2-trichloroethane, 1,1,1,2-tetrachloroethane, 1,1,2,2-tetrachloroethane, tetrachloroethylene, carbon tetrachloride or chloroform may be mentioned. These organic solvents may be used alone or in combination as a mixture. When a halogen derivative or a mixture of halogen derivatives is used, good results may sometimes be obtainable with respect to the polymerization activities and the stereospecificity of the polymer.

There is no particular restriction as to the amounts of the reactants (i), (ii), (iii), (iv), (v) and (vi) to be used in the present invention. However, the molar ratio of the magnesium atom (i) to the oxygen-containing organic compound of aluminum (ii) is preferably within a range of from 1:0.01 to 1:20. Particularly when polymer particles having a pellet size of at least 3,000 µm are to be obtained, the molar ratio is preferably selected within a range of from 1:0.05 to 1:10. Further, it is preferred to select the amounts so that the molar ratio of the magnesium atom (i) to the oxygen-containing organic compound of titanium (iii) will be from 1:0.01 to 1:20, particularly from 1:0.1 to 1:5 in order to obtain polymer particles of a pellet size having excellent powder properties. Further, it is preferred to select the amounts of the reactants so that the ratio of the magnesium atom (i) to the aluminum atom in the aluminum halide compound (iv) will be within a range of from 1:0.1 to 1:100, particularly from 1:0.1 to 1:20. If the ratio of the aluminum atom increases beyond this range, the catalytic activities tend to be low, or it tends to be difficult to obtain good powder properties. On the other hand, if it is too small, it may sometimes be difficult to obtain good powder properties.

It is preferred to select the amounts so that the molar ratio of the magnesium atom (i) to the electron-donative compound (v) will be from 1:0.05 to 1:5.0, particularly from 1:0.1 to 1:2.0. If the amounts are outside this range, a problem may arise such that the polymerization activities tend to be low, or the stereospecificity of the polymer tends to be low. Further, it is preferred to select the amounts of the reactants so that the molar ratio of the magnesium atom (i) to the titanium halide compound (vi) will be within a range of from 1:1 to 1:100, particularly from 1:3 to 1:50. If the amounts are outside this range, a problem may arise such that the polymerization activities tend to be low, or the products tend to be colored.

The reaction to obtain the homogeneous solution from the reactants (i), (ii) and (iii) is conducted usually at a temperature within a range of from $-50°$ to $300°$ C., preferably from $0°$ to $200°$ C. for from 0.5 to 50 hours, preferably from 1 to 6 hours, in an inert gas atmosphere under atmospheric pressure or an elevated pressure. In such a case, it is possible to homogenize the solution in a shorter period of time by adding the same electron-donative compound as the abovementioned compound (v).

Further, the reaction with the reactants (iv), (v) and (vi) is conducted usually at a temperature within a range of $-50°$ to $200°$ C., preferably from $-30°$ to $150°$ C. for from 0.2 to 50 hours, preferably from 0.5 to 10 hours in an inert gas atmosphere under atmospheric pressure or an elevated pressure.

The reaction conditions for the reactant (iv) are very important, since they give a decisive role for the control of the particle sizes and the particle configurations of the resulting solid product and the solid catalyst component and the polymer particles obtained by using the solid catalyst.

Further, the reaction with the reactant (vi) may be conducted in a divided fashion in multi stages. Further, at the time of the reaction with the reactant (vi), ethylene and/or an $\alpha$-olefin of the formula R-CH=CH$_2$ wherein R is a linear or branched, substituted or unsubstituted alkyl group having from 1 to 10 carbon atoms, particularly from 1 to 8 carbon atoms, or a hydrogen atom, may be present. In such a case, it is often possible to obtain an effect such as an improvement in the polymerization activities or in the stereospecificity of the polymer.

The solid catalyst component (A) thus obtained, may be used as it is. However, it is common to remove the remaining unreacted substances and by-products by filtration or decantation, then thoroughly wash it with an inert organic solvent and suspend it in an inert organic solvent for use. It is also possible to use the one which is isolated after washing and then heated under atmospheric pressure or under reduced pressure to remove the inert organic solvent.

In the production of the polyolefin polymer particles having good powder properties by a gas phase polymerization, it is preferred to use a solid catalyst component in a preliminarily polymerized form. That is, prior to the main polymerization, the organometallic compound component as the component (B) is added to the solid catalyst component in an amount of from 0.001 to 200 mol per gram atom of the transition metal in the solid catalyst component, and ethylene and/or an $\alpha$-olefin of the formula R-CH=CH$_2$ wherein R is a linear or branched, substituted or unsubstituted alkyl group having from 1 to 10 carbon atoms, from 1 to 8 carbon atoms, is polymerized in an an amount of from 0.1 to 500 g, preferably from 0.5 to 50 g, per g of the solid catalyst component so that the solid catalyst component can be used in a preliminarily polymerized form. The prepolymerization of the olefin is carried out at a reaction temperature of lower than the melting point of the polymer, in a gas phase or a liquid phase. In the case where the polymerization is conducted in the liquid phase, the olefin itself may be used as a reaction medium, but an inert solvent may be used as the reaction medium. As such an inert solvent, any solvent commonly used in this technical field may be employed. Particularly, an alkane or cycloalkane having from 4 to 20 carbon atoms, such as isobutane, pentane, hexane or cyclohexane may suitably be used. In the prepolymerization, an electron-donative compound such as an oxygen-containing organic compound of silicon may co-exist.

The solid catalyst component thus obtained may be used for the main polymerization as the catalyst component (A) as such. Or, for the purpose of obtaining a stereospecific polymer having a high molecular weight and a wide molecular weight distribution, it may be further reacted with the reactant (vii) and the reactant (viii), and then used for the main polymerization as the catalyst component (A).

As the organic aluminum compound, the organic zinc compound and the organic magnesium compound of the reactant (vii), an organic aluminum compound represented by the formula $AlR^9{}_bX_{3-b}$, an organic zinc compound represented by the formula $R^{10}{}_cZnX_{2-c}$, and an organic magnesium compound represented by the formula $R^{11}{}_dMgX_{2-d}$ may be employed, respectively. In the formula, each of $R^9$, $R^{10}$ and $R^{11}$ is a hydrocarbon group having from 1 to 20 carbon atoms, X is a halogen atom, b is a number of $0<b\leq3$, c is a number of $0<c\leq2$, and d is a number of $0<d\leq2$. Each of $R^9$ $R^{10}$ and $R^{11}$ is preferably selected from a linear or branched alkyl group, a cycloalkyl group, an arylalkyl group, an aryl group and an alkylaryl group. Such organic aluminum compounds, organic zinc compounds and organic magnesium compounds may be used alone or in combination as a mixture of two or more of them.

Specific examples of the organic aluminum compound include, for example, ethylaluminum dichloride, n-propylaluminum dichloride, butylaluminum dichloride, i-butylaluminum dichloride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, diethylaluminum iodide, trimethylaluminum, triethylaluminum, tri-n-propylaluminum, tri-n-butylaluminum, triisobutylaluminum, triisoprenylaluminum, tri-n-hexylaluminum, tri-n-octylaluminum and tri(2-methylpentyl)aluminum.

Specific examples of the organic zinc compound include, for example, methylchloro zinc, methylbromo zinc, methyliodide zinc, dimethyl zinc, ethylchloro zinc, ethylbromo zinc, ethyliodide zinc, diethyl zinc, di-n-propyl zinc, n-butylchloro zinc, n-butylbromo zinc, n-butyliodide zinc, di-n-butyl zinc, i-butylchloro zinc, i-butylbromo zinc, i-butyliodide zinc, di-i-butyl zinc, sec-butylchloro zinc, sec-butylbromo zinc, sec-butyliodide zinc, di-sec-butyl zinc, t-butylchloro zinc, t-butylbromo zinc, t-butyliodide zinc, di-t-butyl zinc, di-n-hexyl zinc, di-n-octyl zinc, methylethyl zinc, methylbutyl zinc, ethylbutyl zinc, phenylchloro zinc, phenylbromo zinc, phenyliodide zinc, diphenyl zinc, methylphenyl zinc, ethylphenyl zinc, n-butylphenyl zinc, and dibenzyl zinc.

Specific examples of the organic magnesium compound include, for example, methyl magnesium chloride, methyl magnesium bromide, ethyl magnesium chloride, ethyl magnesium bromide, n-propyl magnesium chloride, n-propyl magnesium bromide, i-propyl magnesium chloride, i-propyl magnesium bromide, n-butyl magnesium bromide, n-butyl magnesium iodide, i-butyl magnesium chloride, i-butyl magnesium bromide, i-butyl magnesium iodide, sec-butyl magnesium chloride, sec-butyl magnesium bromide, sec-butyl magnesium iodide, t-butyl magnesium chloride, t-butyl magnesium bromide, t-butyl magnesium iodide, n-hexyl magnesium chloride, n-octyl magnesium chloride, phenyl magnesium chloride, phenyl magnesium bromide, phenyl magnesium iodide, benzyl magnesium chloride, benzyl magnesium bromide, dimethyl magnesium, diethyl magnesium, di-n-propyl magnesium, n-butyl-n-propyl magnesium, n-butylmethyl magnesium, n-butylethyl magnesium, n-butyl-n-propyl magnesium, di-n-butyl magnesium, di-n-hexyl magnesium, i-butylethyl magnesium, sec-butylethyl magnesium, t-butylethyl magnesium, di-i-butyl magnesium and di-t-butyl magnesium.

Further, a complex among the organic aluminum compound, the organic zinc compound and the organic magnesium compound, such as 7.5-di-n-butyl magnesium.triethyl aluminum and di-n-butyl magnesium.2.0-triethyl aluminum, may be employed.

As the oxygen-containing organic compound of silicon as the reactant (viii) represented by the formula t-Bu($R^1$)Si($OR^2$)$_2$ wherein t-Bu is a tertiary butyl group, $R^1$ is a linear hydrocarbon group having from 2 to 20 carbon atoms, and $R^2$ is a hydrocarbon group having from 1 to 5 carbon atoms, there may be mentioned t-butylethyldimethoxysilane, t-butyl-n-propyldimethoxysilane, t-butyl-n-butyldimethoxysilane, t-butyl-n-pentyldimethoxysilane, t-butyl-n-hexyldimethoxysilane, t-butyl-n-heptyldimethoxysilane, t-butyl-n-octyldimethoxysilane, t-butyl-n-nonyldimethoxysilane, t-butyl-n-decyldimethoxysilane, t-butyl-n-undecyldimethoxysilane, t-butyl-n-dodecyldimethoxysilane, t-butyl-n-tridecyldimethoxysilane, t-butyl-n-tetradecyldimethoxysilane, t-butyl-n-pentadecyldimethoxysilane, t-butyl-n-hexadecyldimethoxysilane, t-butyl-n-heptadecyldimethoxysilane, t-butyl-n-octadecyldimethoxysilane, t-butyl-n-nonadecyldimethoxysilane, t-butyl-n-eicosyldimethoxysilane, t-butylethyldiethoxysilane, t-butyl-n-propyldiethoxysilane, t-butyl-n-butyldiethoxysilane, t-butyl-n-pentyldiethoxysilane, t-butyl-n-hexyldiethoxysilane, t-butyl-n-heptyldiethoxysilane, t-butyl-n-octyldiethoxysilane, t-butyl-n-nonyldiethoxysilane, t-butyl-n-decyldiethoxysilane, t-butyl-n-undecyldiethoxysilane, t-butyl-n-dodecyldiethoxysilane, t-butyl-n-tridecyldiethoxysilane, t-butyl-n-tetradecyldiethoxysilane, t-butyl-n-pentadecyldiethoxysilane, t-butyl-n-hexadecyldiethoxysilane, t-butyl-n-heptadecyldiethoxysilane, t-butyl-n-octadecyldiethoxysilane, t-butyl-n-nonadecyldiethoxysilane, t-butyl-n-eicosyldiethoxysilane, t-butylethylmethoxyethoxysilane, t-butyl-n-propylmethoxyethoxysilane, t-butyl-n-butylmethoxyethoxysilane, t-butyl-n-pentylmethoxyethoxysilane, t-butyl-n-hexylmethoxyethoxysilane, t-butyl-n-heptylmethoxyethoxysilane, t-butyl-n-octylmethoxyethoxysilane, t-butyl-n-nonylmethoxyethoxysilane, t-butyl-n-decylmethoxyethoxysilane, t-butyl-n-undecylmethoxyethoxysilane, t-butyl-n-dodecylmethoxyethoxysilane, t-butyl-n-tridecylmethoxyethoxysilane, t-butyl-n-tetradecylmethoxyethoxysilane, t-butyl-n-pentadecylmethoxyethoxysilane, t-butyl-n-hexadecylmethoxyethoxysilane, t-butyl-n-heptadecylmethoxyethoxysilane, t-butyl-n-octadecylmethoxyethoxysilane, t-butyl-n-nonadecylmethoxyethoxysilane, t-butyl-n-eicosylmethoxyethoxysilane, t-butylethyldipropoxysilane, t-butyl-n-propyldipropoxysilane, t-butyl-n-butyldipropoxysilane, t-butylethyldi-i-propoxysilane, t-butyl-n-propyldi-i-propoxysilane, t-butyl-n-butyldi-i-propoxysilane, t-butylethylmethoxypropoxysilane, t-butyl-n-propylmethoxypropoxysilane, t-butyl-n-butylmethoxypropoxysilane, t-butylethylethoxypropoxysilane, t-butyl-n-propoylethoxypropoxysilane, t-butyl-n-butylethoxypropoxysilane, t-butylethyldibutoxysilane, t-butylethylbutoxymethoxysilane, t-butylethylbutoxyethoxysilane, t-butylethyldipentoxysilane, t-butylethylpentoxymethoxysilane, t-butyl-n-butyldi-t-butoxysilane, t-butyl-n-butyldi-sec-butoxysilane, and t-butyl-n-butyl-i-pentoxymethoxysilane. Such oxygen-containing organic compounds of silicon may be used alone or in combination as a mixture of two or more of them.

The amounts of the reactants (vii) and (viii) used to obtain the catalyst component (A) are not particularly restricted, but it is preferred to select the amounts so that the atomic ratio of Ti in the solid catalyst component (or its preliminarily polymerized form) to the metal (Al, Zn, Mg) in the reactant (vii) will be from 1:0.01 to 1:200, preferably from 1:0.1 to 1:50.

It is preferred to select the amounts so that the atomic ratio of the metal (Al, Zn, Mg) in the reactant (vii) to Si in the reactant (viii) will be from 1:0.01 to 1:100, preferably, from 1:0.01 to 1:20.

The catalytic reaction to obtain the catalyst component (A) is carried out at a temperature within a range of from −50° to 150° C., preferably from 0° to 100° C., for from 0.5 to 20 hours, preferably from 1 to 5 hours, in an inert gas atmosphere under atmospheric pressure or under reduced pressure. At that time, it is preferred to conduct the catalytic reaction under stirring in the presence of the above-mentioned inert solvent to avoid breakage of the solid catalyst component or unevenness of the catalytic reaction.

The catalyst component (A) thus obtained, may be used as it is. However, it is possible to use the one which is obtained by removing the remaining unreacted substances and by-products by filtration or decantation, then thoroughly washing it with an inert organic solvent. It is also possible to use the one which is isolated after washing and then heated under atmospheric pressure or under reduced pressure to remove the inert organic solvent.

The catalyst component (A) thus obtained is used for the polymerization of an olefin in combination with the organometallic compound for component (B) and the electron-donative compound for component (C).

As the organometallic compound for component (B), an organometallic compound composed of a metal such as lithium, magnesium, zinc, tin or aluminum and an organic group, may be mentioned. As the organic group, an alkyl group may be mentioned as a representative. As such an alkyl group, a linear or branched alkyl group having from 1 to 20 carbon atoms, may be employed. Specifically, n-butyl lithium, diethyl magnesium, diethyl zinc, trimethyl aluminum, triethyl aluminum, tri-i-butyl aluminum, tri-n-butyl aluminum, tri-n-decyl aluminum, tetraethyl tin or tetrabutyl tin, may, for example, be mentioned.

Among them, a trialkyl aluminum represented by the formula $AlR^{12}_3$ is preferred In this formula, $R^{12}$ is a linear or branched alkyl group having from 1 to 10 carbon atoms. Specific examples include trimethyl aluminum, triethyl aluminum, tri-n-propyl aluminum, tri-n-butyl aluminum, tri-isobutyl aluminum, tri-isoprenyl aluminum, tri-n-hexyl aluminum, tri-n-octyl aluminum and tri(2-methylpentyl) aluminum.

Further, it is possible to use an alkyl aluminum halide, an alkyl aluminum hydride and an alkyl aluminum alkoxide, represented by the formula $R^{13}_e AlY_{3-e}$. In this formula, $R^{13}$ is a linear or branched alkyl group having from 1 to 10 carbon atoms, Y is a halogen, hydrogen or an alkoxy group, and e is a number of $0<e<3$.

Specific examples include dimethyl aluminum chloride, methyl aluminum sesquichloride, methyl aluminum dichloride, diethyl aluminum chloride, ethyl aluminum sesquichloride, ethyl aluminum dichloride, di-n-propyl aluminum chloride, di-n-butyl aluminum chloride, di-isobutyl aluminum chloride, isobutyl aluminum dichloride, diethyl aluminum iodide, diethyl aluminum fluoride, diethyl aluminum bromide, diisobutyl aluminum hydride, diethyl aluminum hydride, diethyl aluminum methoxide, diethyl aluminum ethoxide, diisobutyl aluminum methoxide, diisobutyl aluminum ethoxide and diisobutyl aluminum isopropoxide.

These organometallic compounds may be used alone or in combination as a mixture of two or more of them.

As component (C), the following electron donative compounds may be used.

To obtain a stereospecific polymer free from an odor due to an aromatic compound, the solid catalyst component is used as the catalyst component (A), and as the component (C), an oxygen-containing organic compound of silicon which has no aromatic substituent and which has at least one hydrocarbon group containing a secondary or tertiary carbon directly bonded to a silicon atom, is used. As the oxygen-containing organic compound of silicon, the one represented by the formula $R^{14}R^{15} Si(OR^{16})_t X_{3-(s+t)}$, is used In this formula, $R^{14}$ is a branched alkyl group having from 3 to 20 carbon atoms, preferably from 3 to 10 carbon atoms, and a secondary or tertiary carbon directly bonded to the silicon atom; a branched alkenyl group having from 3 to 20 carbon atoms, and a secondary or tertiary carbon directly bonded to the silicon atom; a branched alkynyl group having from 4 to 20 carbon atoms, and a secondary or tertiary carbon directly bonded to the silicon atom; a cycloalkyl group having from 3 to 20 carbon atoms, and a secondary or tertiary carbon directly bonded to the silicon atom; a cycloalkenyl group having from 4 to 20 carbon atoms, and a secondary or tertiary carbon directly bonded to the silicon atom; a cycloalkynyl group having from 4 to 20 carbon atoms, and a secondary or tertiary carbon directly bonded to the silicon atom; or a hydrogen atom.

$R^{15}$ is the same hydrocarbon group as shown for $R^{14}$, or a linear alkyl group having from 1 to 20 carbon atoms, preferably from 1 to 4 carbon atoms; a branched alkyl group having from 1 to 20 carbon atoms, and a primary carbon directly bonded to the silicon atom; a cycloalkyl group having from 3 to 20 carbon atoms, and a primary carbon directly bonded to the silicon atom; a linear alkenyl group having from 2 to 20 carbon atoms, preferably from 2 to 4 carbon atoms; or a linear alkynyl group having from 2 to 20 carbon atoms, preferably from 2 to 4 carbon atoms.

$R^{16}$ is a linear or branched alkyl group having from 1 to 6 carbon atoms, s and t are numbers satisfying $0 \leq s \leq 3$, $1 \leq t \leq 3$ and $1 \leq s+t \leq 3$, and X is a halogen atom.

Specific examples include alkoxysilanes, for example, norbornyltrimethoxysilane, norbornenyltrimethoxysilane, cyclohexyltrimethoxysilane, cyclopentyltrimethoxysilane, cyclobutyltrimethoxysilane, cyclopentadienyltrimethoxysilane, isopropyltrimethoxysilane, sec-butyltrimethoxysilane, t-butyltrimethoxysilane, sec-amyltrimethoxysilane, t-amyltrimethoxysilane, cyclohexyltrimethoxysilane, cyclopentyltrimethoxysilane, cyclobutyltrimethoxysilane, norbornyltriethoxysilane, norbornenyltriethoxysilane, cyclohexyltriethoxysilane, cyclopentyltriethoxysilane, cyclobutyltriethoxysilane, cyclopentadienyltriethoxysilane, isopropyltriethoxysilane, sec-butyltriethoxysilane, t-butyltriethoxysilane, cyclohexyltriethoxysilane, cyclopentyltriethoxysilane, cyclobutyltriethoxysilane, sec-amyltriethoxysilane, t-amyltriethoxysilane, dinorbornyldimethoxysilane, norbornylmethyldimethoxysilane, dinorbornenyldimethoxysilane, norbornenylmethyldimethoxysilane, dicyclohexyldimethoxysilane, cyclohexylmethyldimethoxysilane, dicyclopentyldimethoxysilane, cyclopentylmethyldimethoxysilane, dicyclobutyldimethoxysilane, cyclobutylmethyldimethoxysilane, dicyclopentadienyldimethoxysilane, cyclopentadienylmethyldimethoxysilane, diisopropyldimethoxysilane, isopropylmethyldimethoxysilane, isopropylethyldimethoxysilane, isopropyl-n-propyldimethoxysilane, isopropyl-n-butyldimethoxysilane, isopropylisobutyldimethoxysilane, di(sec-butyl)dimethoxysilane, sec-butylmethyldimethoxysilane, sec-butylethyldimethoxysilane, sec-butyl-n-propyldimethoxysilane, sec-butyl-isopropyldimethoxysilane, sec-butyl-n-butyldimethoxysilane, sec-butyl-isobutyldimethoxysilane, di(t-butyl)dimethoxysilane, t-butylmethyldimethoxysilane, t-butyl-isopropyldimethoxysilane, t-butylisobutyldimethoxysilane, t-butyl(sec-butyl)dimethoxysilane, di(t-amyl)dimethoxysilane, (t-amyl)methydimethoxysilane, t-amyl-i-propyldimethoxysilane, t-butyl-t-amyldimethoxysilane, bis(1,1-diethylpropyl)dimethoxysilane, (1,1-diethylpropyl)methyldimethoxysilane, bis(1,1-dicyclohexylethyl)dimethoxysilane, bis(1-cyclohexyl-1-methylethyl)dimethoxysilane, bis(1-cyclohexylethyl)dimethoxysilane, di(sec-amyl)dimethoxysilane, (sec-amyl)methyldimethoxysilane, diisoamyldimethoxysilane, dinorbornyldiethoxysilane, norbornylmethyldiethoxysilane, dinorbornenyldiethoxysilane, norbornenylmethyldiethoxysilane, dicyclohexyldiethoxysilane, cyclohexylmethyldiethoxysilane, dicyclopentyldiethoxysilane, cyclopentylmethyldiethoxysilane, dicyclobutyldiethoxysilane, cyclobutylmethyldiethoxysilane, dicyclopentadienyldiethoxysilane, cyclopentadienylmethyldiethoxysilane, dicyclohexenyldimethoxysilane, cyclohexenylmethyldimethoxysilane, diisopropyldiethoxysilane, isopropylmethyldiethoxysilane, isopropylethyldiethoxysilane, isopropyl-n-propyldiethoxysilane, isopropyl-n-butyldiethoxysilane, isopropylisobutyldiethoxysilane, di(sec-butyl)diethoxysilane, sec-butylmethyldiethoxysilane, sec-butylethyldiethoxysilane, sec-butyl-n-propyldiethoxysilane, sec-butyl-isopropyldiethoxysilane, sec-butyl-n-butyldiethoxysilane, sec-butyl-isobutyldiethoxysilane, di(t-butyl)diethoxysilane, t-butylmethyldiethoxysilane, t-butyl-isopropyldiethoxysilane, t-butylisobutyldiethoxysilane, t-butyl(sec-butyl)diethoxysilane, di(t-amyl)diethoxysilane, (t-amyl)methyldiethoxysilane, t-amyl-i-propyldiethoxysilane, t-butyl-t-amyldiethoxysilane, bis(1,1-diethylpropyl)diethoxysilane, (1,1-diethylpropyl)methyldiethoxysilane, bis(1,1-dicyclohexylethyl)diethoxysilane, bis(1-cyclohexyl-1-methylethyl)diethoxysilane, bis(1-cyclohexylethyl)diethoxysilane, di(sec-amyl)diethoxysilane, (sec-amyl)methyldiethoxysilane, diisoamyldiethoxysilane, cyclohexylethyldimethoxysilane, cyclohexyl-n-propyldimethoxysilane, cyclohexyl-isopropyldimethoxysilane, cyclohexylbutyldimethoxysilane, cyclopentylethyldimethoxysilane, cyclopentylbutyldimethoxysilane, cyclopentylisobutyldimethoxysilane, cyclohexylmethyldi-n-propoxysilane, cyclohexylmethyldiisopropoxysilane, t-butylmethyldiisopropoxysilane, cyclohexylmethyldi(t-butoxy)silane, t-butylmethyldi(t-butoxy)silane, cyclohexylvinyldimethoxysilane, cyclopentylvinyldimethoxysilane, cyclobutylvinyldimethoxysilane, isopropylvinyldimethoxysilane, isobutylvinyldimethoxysilane, sec-butylvinyldimethoxysilane, t-butylvinyldimethoxysilane, cyclohexylvinyldiethoxysilane, cyclopentylvinyldiethoxysilane, cyclobutylvinyldiethoxysilane, isopropylvinyldiethoxysilane, isobutylvinyldiethoxysilane, sec-butylvinyldiethoxysilane, t-butylvinyldiethoxysilane, isopropyl(1-methylvinyl)dimethoxysilane, isobutyl(1-methylvinyl)dimethoxysilane, sec-butyl(1-methylvinyl)dimethoxysilane, t-butyl(1-methylvinyl)dimethoxysilane, isopropyl(1-methyl-2-propenyl)dimethoxysilane, isobutyl(1-methyl-2-propenyl)dimethoxysilane, sec-butyl(1-methyl-2-propenyl)dimethoxysilane, t-butyl(1-methyl-2-propenyl)dimethoxysilane, isopropyl(1-methyl-1-propenyl)dimethoxysilane, isobutyl(1-methyl-1-propenyl)dimethoxysilane, sec-butyl(1-methyl-1-propenyl)dimethoxysilane, t-butyl(1-methyl-1-propenyl)dimethoxysilane, bis(1-methylvinyl)dimethoxysilane, bis(1-methyl-2-propenyl)dimethoxysilane, bis(1-methyl-1-propenyl)dimethoxysilane, (1-methyl-2-butenyl)dimethoxysilane and (1-methyl-1-butenyl)dimethoxysilane.

Such oxygen-containing organic compounds of silicon may be used alone or two or more of them may be mixed or reacted for use.

The conventional magnesium halide-carrying type catalyst exhibits higher catalytic activities and higher stereospecificity of the polymer as compared with the titanium trichloride type catalyst, but the molecular weight of the resulting polymer is low. Therefore, further improvements are desired.

To produce in good yield a polymer having a high molecular weight and less odor due to an aromatic compound as compared with the conventional magnesium halide-carrying type catalyst, a compound similar to the oxygen-containing organic compound of silicon for the above component (viii) represented by the formula t-Bu($R^1$)Si(OR$^2$)$_2$ wherein t-Bu is a tertiary-butyl group, $R^1$ is a linear hydrocarbon group having from 2 to 20 carbon atoms, and $R^2$ is a hydrocarbon group having from 1 to 5 carbon atoms, is employed, in this catalyst system, as the oxygen-containing organic compound of silicon for reactant (C) having at least one hydrocarbon group containing a secondary or tertiary carbon directly bonded to the silicon atom.

The oxygen-containing organic compounds of silicon may be used alone, or two or more of them may be mixed or reacted for use. It may be used in combination with the above-mentioned oxygen-containing organic compound of silicon having at least one hydrocarbon group containing a secondary or tertiary carbon directly bonded to the silicon atom.

To obtain a stereospecific polymer having a high molecular weight and a wide molecular weight distribution, as the catalyst component (A), the one which is obtained by catalytically reacting the solid catalyst component with the component (vii) and the component (viii), may be employed. As the electron-donative compound for component (C), organic esters, oxygen-containing organic compounds of silicon and nitrogen-containing organic compounds may be used.

As the organic esters, the same compounds as the reactant (v) to be used for the preparation of the solid catalyst component (A) may be mentioned. Among them, preferred are aliphatic carboxylic esters and aromatic carboxylic esters. Specifically, the aliphatic carboxylic esters include, for example, ethyl acetate, propyl acetate, butyl acetate, methyl propionate, ethyl propionate and ethyl butylate, having from 2 to 18 carbon atoms. The aromatic carboxylic esters include, for example, methyl benzoate, ethyl benzoate, ethyl p-ethoxy benzoate, methyl p-toluate, ethyl p-toluate, methyl anisate and ethyl anisate, having from 8 to 24 carbon atoms. Such organic esters may be used alone, or two or more of them may be mixed or reacted for use.

As the oxygen-containing organic compounds of silicon, oxygen-containing organic compounds of silicon of the formula $R^{17}{}_i Si(OR^{18})_j X_{4-(i+j)}$ may be used In the formula, each of $R^{17}$ and $R^{18}$ is a hydrocarbon group having from 1 to 20, preferably from 1 to 10, carbon atoms, such as a linear or branched alkyl group, a cycloalkyl group, an arylalkyl group, an aryl group or an alkylaryl group, or a hydrogen atom, i and j represent numbers satisfying $0 \leq i < 3$, $1 \leq j \leq 4$ and $1 \leq i+j \leq 4$, and X is a halogen atom.

As specific examples, there may be mentioned alkoxysilanes or aryloxysilanes, such as tetramethoxysilane, tetraethoxysilane, tetra-n-propoxysilane, tetra-i-propoxysilane, tetra-n-butoxysilane, tetra-i-pentoxysilane, tetra-n-hexoxysilane, tetraphenoxysilane, tetrakis(2-ethylhexoxy)silane, tetrakis(2-ethylbutoxy)silane, tetrakis(2-methoxyethoxy)silane, methyltrimethoxysilane, ethyltrimethoxysilane, n-butyltrimethoxysilane, phenyltrimethoxysilane, vinyltrimethoxysilane, chloromethyltrimethoxysilane, 3-chloropropyltrimethoxysilane, chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, triethoxysilane, ethyltri-i-propoxysilane, vinyltri-i-propoxysilane, i-pentyltri-n-butoxysilane, methyltri-i-pentoxysilane, ethyltri-i-pentoxysilane, methyltri-n-hexoxysilane, phenyltri-i-pentoxysilane, n-propyltrimethoxysilane, i-propyltrimethoxysilane, i-butyltrimethoxysilane, dimethyldimethoxysilane, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, dibenzyldiethoxysilane, diethoxysilane, dimethyldi-n-butoxysilane, dimethyldi-i-pentoxysilane, diethyldi-i-pentoxysilane, di-i-butyldi-i-pentoxysilane, diphenyldi-i-pentoxysilane, diphenyldi-n-octoxysilane, diisobutyldimethoxysilane, trimethylmethoxysilane, trimethylethoxysilane, dimethylethoxysilane, trimethyl-i-propoxysilane, trimethyl-n-propoxysilane, trimethyl-t-butoxysilane, trimethyl-i-butoxysilane, trimethyl-n-butoxysilane, trimethyl-n-pentoxysilane and trimethylphenoxysilane, or haloalkoxysilanes, or haloaryloxysilanes such as dichlorodiethoxysilane, dichlorodiphenoxysilane and tribromoethoxysilane, or the above-mentioned oxygen-containing organic compounds of silicon having at least one hydrocarbon group containing a secondary or tertiary carbon directly bonded to the silicon atom. Such oxygen-containing organic compounds of silicon may be used alone, or two or more of them may be mixed or reacted for use.

As the nitrogen-containing organic compounds, compounds having nitrogen atoms in the molecules and having functions as Lewis bases may be mentioned.

Specifically, they include, for example, amide compounds such as acetic N,N-diemthylamide, benzoic N,N-dimethylamide and toluic N,N-diemthylamide, piperidine compounds such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidylbenzoate and bis(2,2,6,6-tetramethyl-4-piperidyl)sebacate, pyridine compounds such as 2,6-diisopropylpyridine, 2,6-diisobutylpyridine and 2-isopropyl- 6-methylpyridine, pyrrolidine compounds such as 2,2,5,5-tetramethylpyrrolidine, 2,5-diisopropylpyrrolidine, 2,2,5-trimethylpyrrolidine, 1,2,2,5,5-pentamethylpyrrolidine and 2,5-diisobutylpyrrolidine, amine compounds such as trimethylamine, triethylamine, tributylamine, tribenzylamine, tetramethylethylenediamine, diisopropylethylamine, tert-butyldimethylamine, diphenylamine and di-o-tolylamine, and aniline compounds such as N,N-diethylaniline and N,N-diisopropylaniline. Such nitrogen-containing organic compounds may be used alone or two or more of them may be mixed or reacted for use.

These organic esters, oxygen-containing organic compounds of silicon, and nitrogen-containing organic compounds may be used in combination.

To obtain a stereospecific polymer having a high molecular weight, as the catalyst component (A), the one obtained by contacting and reacting the solid catalyst component with the reactants (vii) and (viii), is employed, and as the electron-donative compound for the component (C), a compound similar to the oxygen-containing organic compound of silicon for the reactant (viii) of the formula t-Bu($R^1$)Si($OR^2$)$_2$ wherein t-Bu is a tertiary-butyl group, $R^1$ is a linear hydrocarbon group having from 2 to 20 carbon atoms, and $R^2$ is a hydrocarbon group having from 1 to 5 carbon atoms, is employed. Here, the component (C) may be the same as or different from the reactant (viii), and may be used alone or in combination as a mixture of two ore more of them.

The catalyst component (A) is used preferably in an amount corresponding to from 0.001 to 2.5 milligram atom of titanium atom in the catalyst component (A) per liter of the reactor.

The organometallic compound for the component (B) is used usually in an amount corresponding to from 1 to 2,000 mol, preferably from 2 to 500 mol, per gram atom of titanium in the component (A).

The electron-donative compound for the component (C) is used usually in an amount corresponding to from 0.001 to 20 mol, preferably from 0.01 to 5 mol, per mol of the organometallic compound for the component (B).

There is no particular restriction as to the manner of introducing the three components in the present invention. For example, it is possible to employ a method wherein the components (A), (B) and (C) are separately introduced into the polymerization reactor, or a method wherein the components (A) and (B) are contacted, and then the component (C) is contacted thereto for polymerization, or a method wherein the components (B) and (C) are contacted, and then the component (A) is contacted thereto for polymerization, or a method wherein the components (A), (B) and (C) are preliminarily contacted, followed by polymerization.

The polymerization of an olefin is conducted at a reaction temperature lower than the melting point of the polymer in a gas phase or in a liquid phase. When the polymerization is conducted in a liquid phase, an inert solvent may be used as the reaction medium, although the olefin itself may be used as the reaction medium. As such an inert solvent, any solvent which is commonly employed in this technical field may be employed. Particularly preferred is an alkane or a cycloalkane having from 4 to 20 carbon atoms, such as isobutane, pentane, hexane or cyclohexane.

As the olefin to be polymerized in the method for producing a stereospecific polyolefin according to the present invention, ethylene and/or an α-olefin of the formula R-CH=$CH_2$ wherein R is a linear or branched, substituted or unsubstitued alkyl group having from 1 to 10 carbon atoms, particularly from 1 to 8 carbon atoms, may be mentioned. As the α-olefin, specifically, propylene, 1-butene, 1-pentene, 4-methyl-l-pentene or 1-octene, may be mentioned.

These olefins may be subjected to not only homopolymerization, but also to random copolymerization or block copolymerization. For the copolymerization, two or more of the above-mentioned α-olefins, or an α-olefin and a diene such as butadiene or isoprene, may be used for polymerization. It is particularly preferred to conduct the polymerization by using propylene, propylene and ethylene, propylene and the above-mentioned α-olefin other than propylene, or propylene and a diene.

There is no particular restriction as to the reaction conditions for polymerization, so long as the polymerization is conducted at a reaction temperature lower than the melting point of the polymer. However, a reaction temperature of from 20° to 100° C. and a pressure of from 2 to 50 kg/$cm^2$ G are usually selected.

The reactor to be used for the polymerization step may be any reactor which is commonly used in this particular field. Namely, the polymerization operation may be conducted in a continuous system, in a semi-batch system or in a batch system using a stirring tank type reactor, a fluidized bed reactor or a circulation type reactor. Further, it is also possible to conduct the polymerization in a plurality of steps under different polymerization reaction conditions.

Now, the present invention will be described in further detail with reference to Examples. However, it should be understood that the present invention is by no means restricted by such specific Examples.

In the Examples and Comparative Examples, the melt flow rate (hereinafter referred to simply as MFR) was measured in accordance with JIS K-7210 Condition 14.

The xylene-soluble content (hereinafter referred to simply as $X_Y$) as the index for the stereospecificity, is measured as follows. Firstly, 4 g of the polymer was dissolved in 200 ml of xylene, and then left to stand for one hour in a homoiothermal bath at 25° C. The precipitates were filtered off, and the filtrate was recovered. Xylene was evaporated, followed by vacuum drying to recover the xylene soluble content. $X_Y$ is represented by a percentage of the weight of the xylene-soluble content to 4 g of the initial polymer weight. Further, II is, as represented by a weight percentage, the proportion of the insoluble polymer after Soxhlet extraction with boiling n-heptane, to the entire formed polymer.

The catalytic activities are represented by the amount (g) of the polymer formed per g of the solid catalyst component (A).

The intrinsic viscosity [η] of the polymer was measured with respect to its ortho-dichlorobenzene solution at 140° C. Between the intrinsic viscosity [η] and the viscosity average molecular weight Mv, there is the following relation:

$$[\eta]=1.88\times10^{-4}\times Mv^{0.725}$$

The molecular weight distribution ($Q_w=M_w/M_n$) of the polymer was measured by GPC (150C manufactured by Waters Co., column was GMH6-HT of TOSOH Corporation) at 140° C. using ortho-dichlorobenzene as a solvent. As the standard substance, polystyrene (Maximum $M_w$=8,420,000) was used and in addition, polyethylene and $C_{32}H_{66}$ were used to prepare a calibration curve.

With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred to as θ). The average particle size is a value obtained by reading the particle size corresponding to the weight accumulated value 50% of the above approximated line. The content of fine particles shows the ratio of fine particles having a particle size of 105 μm or less by weight %.

EXAMPLE 1

(a) Preparation of solid catalyst component (A)

Into a 3 l flask equipped with a stirrer, 15 g (0.62 mol) of metal magnesium powder was charged, and then 0.75 g of iodine, 401.7 g (3.1 mol) of 2-ethylhexanol, 210 g (0.62 mol) of titanium tetra-n-butoxide and 252 g (1.23 mol) of tri-i-propoxyaluminum were added thereto. The mixture was heated to 90° C. and stirred for one hour under sealing with nitrogen. The temperature was further raised to 140° C., and the reaction was conducted for two hours to obtain a homogeneous solution containing magnesium, titanium and aluminum (Mg—Ti—Al solution).

Into a flask having an internal capacity of 500 ml, the Mg—Ti—Al solution was charged in an amount of 0.066 mol in terms of Mg and cooled to 0° C. Then, a solution prepared by diluting 20.5 g (0.13 mol) of isobutylaluminum dichloride with 157 ml of hexane, was added thereto over a period of two hours. After adding all the amount, the temperature was raised to 70° C. over a period of two hours, whereupon a slurry containing a white solid product, was obtained. The solid product was separated by filtration and washed with hexane.

Into a 1 l glass electromagnetic stirring type autoclave, the slurry containing the white solid product thus obtained was charged, then, a solution prepared by diluting 125 g (0.66 mol) of titanium tetrachloride with 125 g of chlorobenzene, was added in its entire amount, and then 7.3 g (0.026 mol) of diisobutyl phthalate was added thereto. The mixture was reacted at 100° C. for 3 hours. The product was subjected to filtration to collect the solid portion, which was again suspended in a solution prepared by diluting 125 g of titanium tetrachloride with 125 g of chlorobenzene, and the suspension was stirred at 100° C. for two hours. Hexane was added to the product, and washing was conducted thoroughly until any freed titanium compound was no longer detected, to obtain a slurry of solid catalyst component (A) suspended in hexane. The supernatant liquid was removed and the rest was dried under a nitrogen atmosphere and subjected to elemental analysis, whereby Ti was 2.8% by weight.

(b) Polymerization of propylene

The internal atmosphere of an electromagnetic stirring type autoclave made of stainless steel having an internal capacity of 5 l was replaced thoroughly with nitrogen, and 1.2 mmol of triethylaluminum as the catalyst component (B), 0.29 mmol of isopropyl-n-propyldimethoxysilane as the catalyst component (C) and 10 mg of the solid catalyst component (A) were sequentially added thereto. The internal pressure of the autoclave was adjusted to 0.1 kg/cm² G, 0.2 kg/cm² G of hydrogen was added, and 2,000 ml of liquefied propylene was added thereto. After initiating the stirring, the temperature was raised to 70° C., and the polymerization was conducted for 90 minutes. After completion of the polymerization reaction, the stirring was stopped and at the same time, unreacted propylene in the system was discharged, and the formed polymer was recovered. As a result, the formed polymer was 338 g, which corresponded to a catalytic activity of 33,800 g/g. Various properties of the polymer particles were measured, whereby MFR was found to be 1.6 g/10 minutes, $X_Y$ was found to be 0.9%, the bulk density was found to be 0.44 g/cm³, the average particle size was found to be 6,060 μm, σ was found to be 0.14, and the content of fine particles was found to be 0% by weight. Further, the formed polymer particles were spherical, and had no irritating odor.

EXAMPLES 2 AND 3

Using the solid catalyst component (A) prepared in Example 1(a), polymerization of propylene was conducted under the same conditions as in Example 1(b) except that isopropyl-n-hexyldimethoxysilane or sec-butylethyldimethoxysilane was used instead of isopropyltrimethoxysilane used as the catalyst component (C) in Example 1. The catalytic activities, and MFR, $X_Y$, bulk densities, average particle sizes, σ, and contents of fine particles of the polymer particles are shown in Table 1. The presence or absence of an odor of the powder is also shown in Table 1.

COMPARATIVE EXAMPLE 1

A solid catalyst component was prepared in the same manner as in Example 1(a) except that 737 g (4.3 mol) of silicon tetrachloride was used instead of isobutyl aluminum dichloride used as the reactant (iv) in Example 1(a) for the preparation of the solid catalyst component (A). Using the solid catalyst component thus obtained, polymerization of propylene was conducted under the same conditions as in Example 2 by using 0.29 mmol of diisopropyldimethoxysilane as the solid component (C) as used in Example 2. As a result, the catalytic activity was found to be 5,900 g/g. Various properties of the polymer particles were measured, whereby MFR was found to be 0.6 g/10 min, $X_Y$ was found to be 1.5%, the bulk density was found to be 0.28 g/cm³, the average particle size was found to be 580 μm, σ was found to be 0.65, and the content of fine particles was found to be 20% by weight. The formed polymer particles were irregular. Further, generation of the same odor of powder as the undiluted solution of diisopropyldimethoxysilane, was confirmed.

COMPARATIVE EXAMPLES 2 AND 3

Using the solid catalyst component (A) obtained in Comparative Example 1, polymerization of propylene was conducted in the same manner as in Comparative Example 1 except that oxygen-containing organic compounds of silicon as shown in Table 2 were used, respectively, instead of diisopropyldimethoxysilane as the catalyst component (C) used in Comparative Example 1. The catalytic activities and the MFR, $X_Y$, bulk densities, average particle sizes, σ and contents of fine particles of the polymer particles, are shown in Table 2. Further, the presence or absence of an odor of the powders is shown in Table 2.

COMPARATIVE EXAMPLE 4

A solid catalyst component was prepared in the same manner as in Example 1(a) except that 823 g (4.3 mol) of titanium tetrachloride was used instead of isobutyl aluminum dichloride as the reactant (iv) used in Example 1(a) for the preparation of the solid catalyst component (A). Using the solid catalyst component thus obtained, polymerization of propylene was conducted in the same conditions as in Example 2 by using 0.29 mmol of diisopropyldimethoxysilane as the catalyst component (C) as used in Example 2. As a result, the catalytic activity was 6,200 g/g. Various properties of the polymer particles were measured, whereby MFR was found to be 0.8 g/10 min, $X_Y$ was found to be 1.7%, the bulk density was found to be 0.31 g/cm$^3$ the average particle size was found to be 950 μm, σ was found to be 0.96, and the content of fine particles was found to be 25% by weight. Further, the formed polymer particles were irregular, and had the same odor as the odor of the undiluted solution of diisopropyldimethoxysilane.

COMPARATIVE EXAMPLES 5 AND 6

Using the solid catalyst component (A) prepared in Comparative Example 4, polymerization of propylene was conducted under the same conditions as in Comparative Example 4 except that the oxygen-containing organic compounds of silicon as shown in Table 2 were used, respectively, instead of diisopropyldimethoxysilane used as the catalyst component (C) in Comparative Example 4. The catalytic activities and the MFR, $X_Y$, bulk densities, average particle sizes, σ and contents of fine particles of the polymer particles, are shown in Table 2. Further, the presence or absence of an odor of powders is also shown in Table 2.

EXAMPLE 4

(a) Preparation of solid catalyst component (A)

Into a 3 l flask equipped with a stirrer, 15 g (0.62 mol) of metal magnesium powder was charged, and 0.75 g of iodine, 401.7 g (3.1 mol) of 2-ethylhexanol, 210 g (0.62 mol) of titanium tetra-n-butoxide, and 252 g (1.23 mol) of tri-i-propoxy aluminum were added thereto. The temperature was raised to 90° C., and stirring was conducted under sealing with nitrogen for 1 hour. The temperature was raised to 140° C., and the reaction was conducted for 2 hours, whereby a homogeneous solution containing magnesium, titanium and aluminum (Mg—Ti—Al solution) was obtained.

Into a flask equipped with a buffle, having an internal capacity of 500 ml, this Mg—Ti—Al solution was charged in an amount of 0.066 mol in terms of Mg and cooled to 0° C. Then, a solution prepared by diluting 20.5 g (0.13 mol) of isobutyl aluminum dichloride with a mixed solvent of 120 ml of hexane and 50 ml of 1,2-dichloroethane, was added thereto over a period of two hours. After adding all the amount, the temperature was raised to 70° C. over a period of 2 hours, whereby a slurry containing a white solid product was obtained. The solid product was separated by filtration and washed with hexane.

A slurry containing the white solid product thus obtained was charged in a 1 l glass electromagnetic stirring type autoclave, and a solution prepared by diluting 125 g (0.66 mol) of titanium tetrachloride with 125 g of chlorobenzene was added thereto. After adding all the amount, 7.3 g (0.026 mol) of diisobutyl phthalate was added, and the mixture was reacted at 100° C. for 3 hours. The product was subjected to filtration to collect the solid portion, which was again suspended in a solution prepared by diluting 125 g of titanium tetrachloride with 125 g of chlorobenzene, and the suspension was stirred at 100° C. for 2 hours. Hexane was added to the product, and washing was conducted thoroughly until freed titanium compound was no longer detected, to obtain a slurry of solid catalyst component (A) suspended in hexane. The supernatant liquid was removed and the rest was dried under a nitrogen atmosphere and subjected to elemental analysis whereby Ti was 2.8% by weight.

(b) Polymerization of propylene

The internal atmosphere of an electromagnetic stirring type autoclave made of stainless steel having an internal capacity of 5 l was replaced thoroughly with nitrogen, and 1.2 mmol of triethylaluminum as the catalyst component (B), 0.29 mmol of t-butyl-n-propyldimethoxysilane as the catalyst component (C) and 10 mg of the solid catalyst component (A) were sequentially added thereto. The internal pressure of the autoclave was adjusted to 0.1 kg/cm$^2$G, 0.2 kg/cm$^2$G of hydrogen was added, and 2,000 ml of liquefied propylene was added thereto. After initiating the stirring, the temperature was raised to 70° C., and the polymerization was conducted for 90 minutes. After completion of the polymerization reaction, the stirring was stopped and at the same time, unreacted propylene in the system was discharged, and the formed polymer was recovered. As a result, the formed polymer was 456 g, which corresponded to a catalytic activity of 45,600 g/g of the solid catalyst component. Various properties of the polymer particles were measured, whereby MFR was found to be 1.1 g/10 min, $X_Y$ was found to be 0.8%, the bulk density was found to be 0.48 g/cm$^3$, the average particle size was found to be 1,680 μm, σ was found to be 0.11, and the content of fine particles was found to be 0% by weight. Further, the formed polymer particles were spherical, and no irritating odor was generated.

EXAMPLE 5

Using the solid catalyst component (A) prepared in Example 4(a), polymerization of propylene was conducted under the same conditions as in Example 4(b) except that the polymerization temperature was changed to 80° C. The catalytic activities and the MFR, $X_Y$, bulk density, average particle size, σ and content of fine particles of the polymer particles, are shown in Table 3. Further, the presence or absence of an odor of powder is also shown in Table 3.

EXAMPLES 6 AND 7

Using the solid catalyst component (A) prepared in Example 4(a), polymerization of propylene was conducted under the same conditions as in Example 4(b) except that oxygen-containing organic compounds of silicon as shown in Table 3 were used, respectively, instead of t-butyl-n-propyldimethoxysilane used as the catalyst component (C) in Example 4. The catalytic activities and MFR, $X_Y$, bulk densities, average particle sizes, σ and contents of fine particles of the polymer particles are shown in Table 3. Further, the presence or absence of an odor of powders is shown in Table 3.

EXAMPLES 8 TO 12

Using the solid catalyst component (A) prepared in Example 4(a), polymerization of propylene was conducted in the same manner as in Example 4(b) except that oxygen-containing organic compounds of silicon as shown in Table 4 were used, respectively, instead of t-butyl-n-propyldimethoxysilane used as the catalyst component (C) in Example 4 (in Example 8, t-butyl-n-propyldimethoxysilane was used), and no hydrogen was added. The catalytic activities and [η], $X_Y$, bulk densities, average particle sizes, σ and contents of fine particles of the polymer particles are shown in Table 4. Further, the presence or absence of an odor of powders is also shown in Table 4.

COMPARATIVE EXAMPLES 7 TO 8

Using the solid catalyst component (A) prepared in Example 9(a), polymerization of propylene was conducted under the same conditions as in Examples 8 to 12 except that diphenyldimethoxysilane or tertiary-butylphenyldimethoxysiline was used, instead of t-butyl-n-propyldimethoxysilane used as the catalyst component (C) in Example 9. The catalytic activities and [η], $X_Y$, bulk densities, average particle sizes, σ and contents of fine particles are shown in Table 4. Further, the presence or absence of an odor of powders is also shown in Table 4.

The results of polymerization in Examples 1 to 3 are shown in Table 1, the results of polymerization in Comparative Examples 1 to 6 are shown in Table 2, the results of polymerization in Examples 4 to 7 are shown in Table 3, and the results of polymerization in Examples 8 to 12 and Comparative Examples 7 to 8 are shown in Table 4.

EXAMPLE 13

(a) Preparation of solid catalyst component (A)

Into a 3 l flask equipped with a stirrer, 15 g (0.62 mol) of metal magnesium powder was charged, and then 0.75 g of iodine, 401.7 g (3.1 mol) of 2-ethylhexanol, 210 g (0.62 mol) of titanium tetra-n-butoxide and 252 g (1.23 mol) of tri-i-propoxyaluminum were added thereto. The mixture was heated to 90° C. and stirred for one hour under sealing with nitrogen. The temperature was further raised to 140° C., and the reaction was conducted for two hours to obtain a homogeneous solution containing magnesium, titanium and aluminum (Mg—Ti—Al solution).

Into a flask equipped with a buffle, having an internal capacity of 500 ml, the Mg—Ti—Al solution was charged in an amount of 0.066 mol in terms of Mg and cooled to 0° C. Then, a solution prepared by diluting 20.5 g (0.13 mol) of isobutylaluminum dichloride with a mixed solvent of 120 ml of hexane and 50 ml of 1,2-dichloroethane, was added thereto over a period of two hours. After adding all the amount, the temperature was raised to 70° C. over a period of two hours, whereupon a slurry containing a white solid product, was obtained. The solid product was separated by filtration and washed with hexane.

Into a 1 l glass electromagnetic stirring type autoclave, the slurry containing the white solid product thus obtained was charged, then, a solution prepared by diluting 125 g (0.66 mol) of titanium tetrachloride with 125 g of chlorobenzene, was added in its entire amount, and then 7.3 g (0.026 mol) of diisobutyl phthalate was added thereto. The mixture was reacted at 100° C. for 3 hours. The product was subjected to filtration to collect the solid portion, which was again suspended in a solution prepared by diluting 125 g of titanium tetrachloride with 125 g of chlorobenzene, and the suspension was stirred at 100° C. for two hours. Hexane was added to the product, and washing was conducted thoroughly until any freed titanium compound was no longer detected, to obtain a slurry of solid catalyst component suspended in hexane. The supernatant liquid was removed and the rest was dried under a nitrogen atmosphere and subjected to elemental analysis, whereby Ti was 2.8% by weight.

The internal atmosphere of an electromagnetic stirring type autoclave made of stainless steel having an internal capacity of 1 l was replaced thoroughly with nitrogen, and 5.0 g of the solid catalyst component thus obtained, 300 ml of hexane and 12.5 mmol of triethyl aluminum were sequentially added thereto. The internal pressure of the autoclave was adjusted to 0.1 kg/cm²G, and the internal temperature was adjusted to 20° C. Then, stirring was initiated, and while maintaining the internal temperature at 20° C., 15 g of propylene was supplied over a period of 20 minutes, and then stirring was conducted for 30 minutes. The preliminarily polymerized form with propylene of the solid catalyst component thus obtained, was separated by filtration, and washed thoroughly with hexane. The supernatant was removed and the rest was dried under a nitrogen atmosphere. The yield was 18.5 g.

Into a flask having an internal capacity of 500 ml, the preliminarily polymerized form of propylene with the solid catalyst component was added in its entire amount, and then 300 ml of hexane, 11.7 mmol of triethyl aluminum and 11.7 mmol of t-butyl-n-propyldimethoxysilane were added thereto. The mixture was stirred at room temperature for 30 minutes. Then, the mixture was washed with n-pentane by decantation, and the rest was dried under a stream of nitrogen to obtain a catalyst component (A).

(b) Polymerization of propylene

The internal atmosphere of an electromagnetic stirring type autoclave made of stainless steel having an internal capacity of 5 l was replaced thoroughly with nitrogen, and 1.2 mmol of triethylaluminum as the catalyst component (B), 0.29 mmol of diphenyl dimethoxysilane as the catalyst component (C) and 37 mg of the catalyst component (A) (corresponding to 10 mg of the solid catalyst component) were sequentially added thereto. The internal pressure of the autoclave was adjusted to 0.1 kg/cm² G, 0.2 kg/cm² G of hydrogen was added, and 2,000 ml of liquefied propylene was added thereto. After initiating the stirring, the temperature was raised to 70° C., and the polymerization was conducted for 90 minutes. After completion of the polymerization reaction, the stirring was stopped and at the same time, unreacted propylene in the system was discharged, and the formed polymer was recovered. As a result, the formed polymer was 387 g, and the catalytic activity per 1 g of the solid catalyst component containing no prepolymer content was found to correspond to a catalytic activity of 38,700 g/g. Various properties of the polymer particles were measured, whereby MFR was found to be 3.4 g/10 minutes, $X_Y$ was found to be 1.2%, $Q_W$ was found to be 6.5, the bulk density was found to be 0.48 g/cm³, the average particle size was found to be 1,580 μm, σ was found to be 0.11, and the content of fine particles was found to be 0% by weight. Further, the formed polymer particles were spherical.

EXAMPLE 14

(a) Preparation of solid catalyst component (A)

The solid catalyst component (A) was prepared in the same manner as in Example 13(a).

(b) Polymerization of propylene

The internal atmosphere of an electromagnetic stirring type reactor made of stainless steel having an internal volume of 3 l was replaced thoroughly with argon, and 2.6 mmol of triethyl aluminum as a catalyst component (B), 0.39 mmol of diphenyldimethoxysilane as a catalyst component (C) and 35 mg of a catalyst component (A) (corresponding to 9.5 mg of the solid catalyst component) were sequentially added thereto. 0.33 kg/cm²G of hydrogen was added, and then 780 g of liquefied propylene was added thereto. After initiating the stirring, the temperature was raised to 80° C., and the polymerization was conducted for 120 minutes. After completion of the polymerization reaction, the stirring was stopped, and at the same time, unreacted propylene in the system was discharged, and the formed polymer was recovered. As a result, the formed polymer was 510 g, which corresponded to a catalytic activity of 53,700 g/g. Various properties of the polymer particles were measured, thereby MFR was found to be 4.7 g/10 min, $X_Y$ was found to be 0.6%, $Q_W$ was found to be 6.7, the bulk density was found to be 0.49 g/cm³, the average particle size was found to be 2,100 μm, σ was found to be 0.11, and the content of fine particles was found to be 0% by weight. Further, the formed polymer particles were spherical.

EXAMPLE 15

(a) Preparation of solid catalyst component (A)

The solid catalyst component (A) was prepared in the same manner as in Example 13(a).

(b) Polymerization of propylene

The internal atmosphere of an electromagnetic stirring type reactor made of stainless steel having an internal volume of 1.5 l was replaced thoroughly with nitrogen, and 500 ml of n-heptane which was thoroughly dehydrogenated and deoxidized, 1.09 mmol (125 mg) of triethyl aluminum as a catalyst component (B), 0.2 mmol (52 mg) of diphenyldimethoxysilane as a catalyst component (C), and 56 mg of a catalyst component (A) (corresponding to 15 mg of the solid catalyst component), were sequentially added, and 60 ml of hydrogen was added thereto. The temperature was raised to 75° C., propylene was supplied so that the polymerization pressure would be 5 kg/cm²G, and polymerization was conducted for 120 minutes. After completion of the polymerization reaction, the stirring was stopped and at the same time, unreacted propylene in the system was discharged, and the formed polymer was separated by filtration from the polymer slurry, followed by drying of the polymer. As a result, the filtered polymer was 114 g, which corresponded to a catalytic activity of 7,600 g/g. Various properties of the polymer particles were measured, whereby MFR was found to be 1.2 g/10 min, II was found to be 99.4%, $Q_W$ was found to be 6.5, the bulk density was found to be 0.45 g/cm³, the average particle size was found to be 1,100 μm, σ was found to be 0.11, and the content of fine particles was found to be 0% by weight. Further, the formed polymer particles were spherical.

EXAMPLE 16

Using the catalyst component (A) prepared in Example 13, polymerization of propylene was conducted under the same conditions as in Example 13(b) except that 0.29 mmol of diisobutyldimethoxysilane was used instead of diphenyldimethoxysilane used as the catalyst component (C) in Example 13(b). As a result, the catalytic activity was 30,600 g/g. Various properties of the polymer particles were measured, whereby MFR was found to be 3.1 g/10 min, $X_Y$ was found to be 1.0%, $Q_W$ was found to be 7.0, the bulk density was found to be 0.48 g/cm³, the average particle size was found to be 1,450 μm, σ was found to be 0.11, and the content of fine particles was found to be 0% by weight. Further, the formed polymer particles were spherical.

EXAMPLE 17

Using the catalyst component (A) prepared in Example 13, polymerization of propylene was conducted under the same conditions as in Example 13(b) except that 0.19 mmol of n-propyltrimethoxysilane was used, instead of diphenyldimethoxysilane used as the catalyst component (C) in Example 13(b). As a result, the catalytic activity was found to be 18,400 g/g. Various properties of the polymer particles were measured, whereby MFR was found to be 3.4 g/10 min, $X_Y$ was found to be 1.2%, $Q_W$ was found to be 7.5, the bulk density was found to be 0.47 g/cm³, the average particle size was found to be 1,200 μm, σ was found to be 0.12, and the content of fine particles was found to be 0% by weight. Further, the formed polymer particles were spherical.

EXAMPLE 18

A catalyst component (A) was prepared in the same manner as in Example 13(a) except that 11.7 mmol of t-butyl-n-butyldimemthoxysilane was used instead of t-butyl-n-propyldimethoxysilane used as the reactant (viii) in Example 13(a) for the preparation of the catalyst component (A). Using the catalyst component (A) thus obtained, polymerization of propylene was conducted under the same conditions as in Example 13(b).

As a result, the catalytic activity was found to be 34,300 g/g. Various properties of the polymer particles were measured, whereby MFR was found to be 3.4 g/10 min, $X_Y$ was found to be 1.0%, $Q_W$ was found to be 7.4, the bulk density was found to be 0.48 g/cm³, the average particle size was found to be 1,510 μm, σ was found to be 0.10, and the content of fine particles was found to be 0% by weight. Further, the formed polymer particles were spherical.

EXAMPLE 19

Using the catalyst component (A) prepared in Example 18, polymerization of propylene was conducted under the same conditions as in Example 18 except that 0.29 mmol of diisobutyldimethoxysilane was used, instead of diphenyldimethoxysilane used as the catalyst component (C) in Example 18. As a result, the catalytic activity was found to be 31,500 g/g. Various properties of the polymer particles were measured, whereby MFR was found to be 4.5 g/10 min, $X_Y$ was found to be 1.2%, $Q_W$ was found to be 7.4, the bulk density was found to be 0.48 g/cm³, the average particle size was found to be 1,420 μm, σ was found to be 0.11, and the content of fine particles was found to be 0% by weight. Further, the formed polymer particles were spherical.

EXAMPLE 20

Using the catalyst component (A) prepared in Example 18, polymerization of propylene was conducted under the same conditions as in Example 18 except that 0.19 mmol of n-propyltrimethoxysilane was used, instead of diphenyldimethoxysilane used as the catalyst component (C) in Example 18. As a result, the catalytic activity was found to be 19,100 g/g. Various properties of the polymer particles were measured, whereby MFR was found to be 4.6 g/10 min, $X_Y$ was found to be 1.3%, $Q_W$ was found to be 7.6, the bulk density was found to be 0.46 g/cm³, the average particle size was found to be 1,260 μm, σ was found to be 0.11, and the content of fine particles was found to be 0% by weight. Further, the formed polymer particles were spherical.

EXAMPLE 21

A catalyst component (A) was prepared in the same manner as in Example 13(a) except that 11.7 mmol of t-butyl-n-hexyldimethoxysilane was used, instead of t-butyl-n-propyldimethoxysilane used as the reactant (viii) in Example 13(a). Using the catalyst component (A) thus obtained, polymerization of propylene was conducted under the same conditions as in Example 13(b). As a result, the catalytic activity was found to be 37,300 g/g. Various properties of the polymer particles were measured, whereby MFR was found to be 2.6 g/10 min, $X_Y$ was found to be 0.7%, $Q_W$ was found to be 8.1, the bulk density was found to be 0.48 g/cm³, the average particle size was found to be 1,570 μm, σ was found to be 0.10, and the content of fine particles was found to be 0% by weight. Further, the formed polymer particles were spherical.

EXAMPLE 22

Using the catalyst component (A) prepared in Example 21, polymerization of propylene was conducted under the same conditions as in Example 21 except that 0.29 mmol of diisobutyldimethoxysilane was used, instead of diphenyldimethoxysilane used as the catalyst component (C) in Example 21. As a result, the catalytic activity was found to be 34,400 g/g. Various properties of the polymer particles were measured, whereby MFR was found to be 2.8 g/10 min, $X_Y$ was found to be 1.0%, $Q_W$ was found to be 8.0, the bulk density was found to be 0.48 g/cm³, the average particle size was found to be 1,520 μm, σ was found to be 0.10, and the content of fine particles was found to be 0% by weight. Further, the formed polymer particles were spherical.

EXAMPLE 23

Using the catalyst component (A) prepared in Example 21, polymerization of propylene was conducted under the same conditions as in Example 21 except that 0.19 mmol of n-propyltrimethoxysilane was used, instead of diphenyldimethoxysilane used as the catalyst component (C) in Example 21. As a result, the catalytic activity was found to be 16,500 g/g. Various properties of the polymer particles were measured, whereby MFR was found to be 3.2 g/10 min, $X_Y$ was found to be 1.3%, $Q_W$ was found to be 8.0, the bulk density was found to be 0.46 g/cm³, the average particle size was found to be 1,160 μm, σ was found to be 0.12, and the content of fine particles was found to be 0% by weight. Further, the formed polymer particles were spherical.

EXAMPLE 24

A catalyst component (A) was prepared in the same manner as in Example 13(a) except that 11.7 mmol of diethyl zinc was used instead of triethyl aluminum used as the reactant (vii) in Example 13(a) for the preparation of the catalyst component (A). Using the catalyst component (A) thus obtained, polymerization of propylene was conducted under the same condition as in Example 13(b).

As a result, the catalytic activity was found to be 37,800 g/g. Various properties of the polymer particles were measured, whereby MFR was found to be 3.4 g/10 min, $X_Y$ was found to be 1.0%, $Q_W$ was found to be 7.5, the bulk density was found to be 0.48 g/cm³, the average particle size was found to be 1,550 μm, σ was found to be 0.10, and the content of fine particles was found to be 0% by weight. Further, the formed polymer particles were spherical.

EXAMPLE 25

A catalyst component (A) was prepared in the same manner as in Example 13(a) except that 11.7 mmol of ethylbutyl magnesium was used instead of triethyl aluminum used as the reactant (vii) in Example 13(a). Using the catalyst component (A) thus obtained, polymerization of propylene was conducted under the same conditions as in Example 13(b). As a result, the catalytic activity was found to be 32,400 g/g. Various properties of the polymer particles were measured, whereby MFR was found to be 2.1 g/10 min, $X_Y$ was found to be 1.1%, $Q_W$ was found to be 7.2, the bulk density was found to be 0.48 g/cm³, the average particle size was found to be 1,490 μm, σ was found to be 0.10, and the content of fine particles was found to be 0% by weight. Further, the formed polymer particles were spherical.

EXAMPLE 26

A catalyst component (A) was prepared in the same manner as in Example 13(a) except that 4.0 g (0.027 mmol) of ethyl benzoate was used instead of diisobutyl phthalate added as the reactant (v) in Example 13. Using the catalyst component (A) thus obtained, polymerization of propylene was conducted under the same conditions as in Example 13(b) except that 0.33 mmol of p-ethoxyethylbenzoate was used, instead of diphenyldimethoxysilane as the catalyst component (C) and the polymerization temperature was changed to 65° C.

As a result, the catalytic activity was found to be 16,700 g/g. Various properties of the polymer particles were measured, whereby MFR was found to be 1.3 g/10 min, $X_Y$ was found to be 3.5%, $Q_W$ was found to be 9.7, the bulk density was found to be 0.45 g/cm³, the average particle size was found to be 1,200 μm, σ was found to be 0.13, and the content of fine particles was found to be 0% by weight. Further, the formed polymer particles were spherical.

COMPARATIVE EXAMPLE 9

Using 37 mg of the preliminarily polymerized form of propylene with a solid catalyst component prepared in Example 13(a), polymerization of propylene was conducted in the same manner as in Example 13(b).

As a result, the catalytic activity was found to be 36,000 g/g. Various properties of the polymer particles were measured, whereby MFR was found to be 5.0 g/10 min, $X_Y$ was found to be 1.0%, $Q_W$ was found to be 4.9, the bulk density was found to be 0.48 g/cm³, the average particle size was found to be 1,550 μm, σ was found to be 0.10, and the content of fine particles was found to be 0% by weight. Further, the formed polymer particles were spherical.

COMPARATIVE EXAMPLE 10

A catalyst component (A) was prepared in the same manner as in Example 13(a) except that 11.7 mmol of t-butyl-methyldimethoxysilane was used instead of t-butyl-n-propyldimethoxysilane used as the reactant (viii) in Example 13(a) for the preparation of the catalyst component (A). Using the catalyst component (A) thus obtained, polymerization of propylene was conducted under the same conditions as in Example 13(b).

As a result, the catalytic activity was found to be 21,900 g/g. Various properties of the polymer particles were measured, whereby MFR was found to be 3.1 g/10 min, $X_Y$ was found to be 1.9%, $Q_W$ was found to be 5.6, the bulk density was found to be 0.48 g/cm³, the average particle size was found to be 1,300 µm, σ was found to be 0.10, and the content of fine particles was found to be 0% by weight. Further, the formed polymer particles were spherical.

COMPARATIVE EXAMPLE 11

A catalyst component (A) was prepared in the same manner as in Example 13(a) except that 11.7 mmol of diphenyldimethoxysilane was used instead of t-butyl-n-propyldimethoxysilane used as the reactant (viii) in Example 13(a) for the preparation of the catalyst component (A). Using the catalyst component (A) thus obtained, polymerization of propylene was conducted under the same conditions as in Example 13(b).

As a result, the catalytic activity was found to be 35,200 g/g. Various properties of the polymer particles were measured, whereby MFR was found to be 4.5 g/10 min, $X_Y$ was found to be 1.1%, $Q_W$ was found to be 4.5, the bulk density was found to be 0.48 g/cm$^3$, the average particle size was found to be 1,520 µm, σ was found to be 0.10, and the content of fine particles was found to be 0% by weight. Further, the formed polymer particles were spherical.

COMPARATIVE EXAMPLE 12

Using 37 mg of the preliminarily polymerized form of propylene with a solid catalyst component prepared in Example 26, polymerization of propylene was conducted in the same manner as in Example 26. As a result, the catalytic activity was found to be 14,500 g/g. Various properties of the polymer particles were measured, whereby MFR was found to be 6.0 g/10 min, $X_Y$ was found to be 3.5%, $Q_W$ was found to be 7.0, the bulk density was found to be 0.45 g/cm$^3$, the average particle size was found to be 1,120 µm, σ was found to be 0.13, and the content of fine particles was found to be 0% by weight. Further, the formed polymer particles were spherical.

The results of polymerization in Examples 13 to 18 are shown in Table 5, the results of polymerization in Examples 18 to 23 are shown in Table 6, the results of polymerization in Examples 24 to 26 are shown in Table 7, and the results of polymerization in Comparative Examples 9 to 12 are shown in Table 8.

EXAMPLE 27

(a) Preparation of catalyst component (A)
The catalyst component (A) was prepared in the same manner as in Example 13(a).
(b) Polymerization of propylene
The internal atmosphere of an electromagnetic stirring type reactor made of stainless steel having an internal volume of 5 l was replaced thoroughly with nitrogen, and 1.2 mmol of triethyl aluminum as a catalyst component (B), 0.29 mmol of t-butyl-n-propyldimethoxysilane as a catalyst component (C) and 37 mg of a catalyst component (A) (corresponding to 10 mg of the solid catalyst component), were sequentially added thereto. The internal atmosphere of the autoclave was adjusted to 0.1 kg/cm$^2$G, 0.2 kg/cm$^2$ of hydrogen was added, and then 2,000 ml of liquefied propylene was added thereto. After initiating the stirring, the temperature was raised to 70° C., and the polymerization was conducted for 90 minutes. After completion of the polymerization reaction, the stirring was stopped, and at the same time, unreacted propylene in the system was discharged, and the formed polymer was recovered. As a result, the formed polymer was 441 g, and the catalytic activities per 1 g of the solid catalyst component containing no prepolymer content was found to be 44,100 g/g. Various properties of the polymer particles were measured, whereby MFR was found to be 1.6 g/10 min, $X_Y$ was found to be 1.0%, $Q_W$ was found to be 6.0, the bulk density was found to be 0.49 g/cm$^3$, the average particle size was found to be 1,660 µm, σ was found to be 0.11, and the content of fine particles was found to be 0% by weight. Further, the formed polymer particles were spherical.

EXAMPLE 28

(a) Preparation of catalyst component (A)
The catalyst component (A) was prepared in the same manner as in Example 13(a).
(b) Polymerization of propylene
The internal atmosphere of an electromagnetic stirring type autoclave made of stainless steel having an internal volume of 3 µm was replaced thoroughly with argon, and 2.6 mmol of triethyl aluminum as a catalyst component (B), 0.39 mmol of t-butyl-n-propyldimethoxysilane as a catalyst component (C) and 35 mg of a catalyst component (A) (corresponding to 9.5 mg of the solid catalyst component), were sequentially added thereto. 0.33 kg/cm$^2$G of hydrogen was added, and then 780 g of liquefied propylene was added thereto. After initiating the stirring, the temperature was raised to 80° C., and the polymerization was conducted for 120 minutes. After completion of the polymerization reaction, the stirring was stopped and at the same time, unreacted propylene in the system was discharged, and the formed polymer was recovered. As a result, the formed polymer was 538 g, which corresponded to a catalytic activity of 56,600 g/g. Various properties of the polymer particles were measured, whereby MFR was found to be 1.2 g/10 min, $X_Y$ was found to be 0.5%, $Q_W$ was found to be 6.2, the bulk density was found to be 0.49 g/cm$^3$, the average particle size was found to be 2,120 µm, σ was found to be 0.11, and the content of fine particles was found to be 0% by weight. Further, the formed polymer particles were spherical.

EXAMPLE 29

(a) Preparation of catalyst component (A)
The catalyst component (A) was prepared in the same manner as in Example 13(a).
(b) Polymerization of propylene
The internal atmosphere of an electromagnetic stirring type autoclave made of stainless steel having an internal volume of 1.5 l was replaced thoroughly with nitrogen, and 500 ml of n-heptane which was thoroughly dehydrogenated and deoxidized, 1.09 mmol (125 mg) of triethyl aluminum as a catalyst component (B), 0.21 mmol (52 mg) of t-butyl-n-propyldimethoxysilane as a catalyst component (C) and 56 mg of a catalyst component (A) (corresponding to 15 mg of the solid catalyst component), were sequentially added thereto. 60 ml of hydrogen was added thereto. The temperature was raised to 75° C., propylene was supplied so that the polymerization pressure would be 5 kg/cm$^2$G, and polymerization was conducted for 120 minutes. After completion of the polymerization reaction, the stirring was stopped and at the same time, unreacted propylene in the system was discharged, and the polymer in the polymer slurry was separated by filtration, followed by drying of the polymer. As a result, the sintered polymer was 123 g, which corresponded to a catalytic activity of 8,200 g/g. Various properties of the polymer particles were measured, whereby MFR was found to be 1.1 g/10 min, II was found to be 99.5%, $Q_W$ was found to be 6.0, the bulk density was found to be 0.45 g/cm$^3$, the average particle size was found to be 1,140 μm, σ was found to be 0.12, and the content of fine particles was found to be 0% by weight. Further, the formed polymer particles were spherical.

EXAMPLE 30

Using the catalyst component (A) prepared in Example 27, polymerization of propylene was conducted under the same conditions as in Example 27(b) except that 0.29 mmol of t-butyl-n-hexyldimethoxysilane was used instead of t-butyl-n-propyldimethoxysilane used as a catalyst component (C) in Example 27(b).

As a result, the catalytic activity was found to be 48,500 g/g. Various properties of the polymer particles were measured, whereby MFR was found to be 1.3 g/10 min, $X_Y$ was found to be 0.8%, $Q_W$ was found to be 6.0, the bulk density was found to be 0.49 g/cm³, the average particle size was found to be 1,700 μm, σ was found to be 0.11, and the content of fine particles was found to be 0% by weight. Further, the formed polymer particles were spherical.

EXAMPLE 31

A catalyst component (A) was prepared in the same manner as in Example 27(a) except that 11.7 mmol of t-butyl-n-butyldimethoxysilane was used instead of t-butyl-n-propyldimethoxysilane used as the reactant (viii) in Example 27(a) for the preparation of the solid component (A). Using the catalyst component (A) thus obtained, polymerization of propylene was conducted under the same conditions as in Example 27(b) except that 0.29 mmol of t-butyl-n-butyldimethoxysilane was used instead of t-butyl-n-propyldimethoxysilane used as the catalyst component (C) in Example 27(b).

As a result, the catalytic activity was found to be 42,800 g/g. Various properties of the polymer particles were measured, whereby MFR was found to be 1.7 g/10 min, $X_Y$ was found to be 0.6%, $Q_W$ was found to be 6.3, the bulk density was found to be 0.49 g/cm³, the average particle size was found to be 1,630 μm, σ was found to be 0.11, and the content of fine particles was found to be 0% by weight. Further, the formed polymer particles were spherical.

EXAMPLE 32

A catalyst component (A) was prepared in the same manner as in Example 27(a) except that 11.7 mmol of t-butyl-n-hexyldimethoxysilane was used instead of t-butyl-n-propyldimethoxysilane used as the reactant (viii) in Example 27(a) for the preparation of the catalyst component (A). Using the catalyst component (A) thus obtained, polymerization of propylene was conducted under the same conditions as in Example 27(b) except that 0.29 mmol of t-butyl-n-hexyldimethoxysilane was used instead of t-butyl-n-propyldimethoxysilane used as the catalyst component (C) in Example 27(b).

As a result, the catalytic activity was found to be 45,000 g/g. Various properties of the polymer particles were measured, whereby MFR was found to be 1.6 g/10 min, $X_Y$ was found to be 0.7%, $Q_W$ was found to be 6.5, the bulk density was found to be 0.49 g/cm³, the average particle size was found to be 1,660 μm, σ was found to be 0.11, and the content of fine particles was found to be 0% by weight. Further, the formed polymer particles were spherical.

EXAMPLE 33

A catalyst component (A) was prepared in the same manner as in Example 27(a) except that 11.7 mmol of diethyl zinc was used instead of triethyl aluminum used as the reactant (vii) in Example 27(a) for the preparation of the catalyst component (A). Using the catalyst component (A) thus obtained, polymerization of propylene was conducted under the same conditions as in Example 27(b).

As a result, the catalytic activity was found to be 47,100 g/g. Various properties of the polymer particles were measured, whereby MFR was found to be 1.4 g/10 min, $X_Y$ was found to be 1.1%, $Q_W$ was found to be 6.5, the bulk density was found to be 0.49 g/cm³, the average particle size was found to be 1,700 μm, σ was found to be 0.11, and the content of fine particles was found to be 0% by weight. Further, the formed polymer particles were spherical.

EXAMPLE 34

A catalyst component (A) was prepared in the same manner as in Example 27(a) except that 11.7 mmol of ethylbutyl magnesium was used instead of triethyl aluminum used as the reactant (vii) in Example 27(a) for the preparation of the catalyst component (A). Using the catalyst component (A) thus obtained, polymerization of propylene was conducted under the same conditions as in Example 27(b).

As a result, the catalytic activity was found to be 43,000 g/g. Various properties of the polymer particles were measured, whereby MFR was found to be 1.6 g/10 min, $X_Y$ was found to be 1.0%, $Q_W$ was found to be 6.2, the bulk density was found to be 0.49 g/cm³, the average particle size was found to be 1,650 μm, σ was found to be 0.11, and the content of fine particles was found to be 0% by weight. Further, the formed polymer particles were spherical.

EXAMPLE 35

Using the catalyst component (A) prepared in Example 27(a), polymerization of propylene was conducted under the same conditions as in Example 27(b) except that no hydrogen was added in Example 27(b).

As a result, the catalytic activity was found to be 27,200 g/g. Various properties of the polymer particles were measured, whereby [η] was found to be 5.5 dl/g, $X_Y$ was found to be 1.1%, the bulk density was found to be 0.48 g/cm³, the average particle size was found to be 1,420 μm, σ was found to be 0.11, and the content of fine particles was found to be 0% by weight. Further, the formed polymer particles were spherical.

EXAMPLE 36

Using the catalyst component (A) prepared in Example 32, polymerization of propylene was conducted under the same conditions as in Example 32 except that no hydrogen was added.

As a result, the catalytic activity was found to be 22,800 g/g. Various properties of the polymer particles were measured, whereby [η] was found to be 5.1 dl/g, $X_Y$ was found to be 1.1%, the bulk density was found to be 0 48 g/cm³ the average particle size was found to be 1,330 μm, σ was found to be 0.11, and the content of fine particles was found to be 0% by weight. Further, the formed polymer particles were spherical.

COMPARATIVE EXAMPLE 13

Using 37 mg of the preliminarily polymerized form of propylene with a solid catalyst component prepared in Example 27(a), polymerization of propylene was conducted in the same manner as in Example 27(b).

As a result, the catalytic activity was found to be 36,000 g/g. Various properties of the polymer particles were measured, thereby [η] was found to be 5.0 g/10 min, $X_Y$ was found to be 1.0%, $Q_W$ was found to be 4.9, the bulk density was found to be 0.48 g/cm$^3$, the average particle size was found to be 1,550 μm, σ was found to be 0.10, and the content of fine particles was found to be 0% by weight. Further, the formed polymer particles were spherical.

COMPARATIVE EXAMPLE 14

A catalyst component (A) was prepared in the same manner as in Example 27(a) except that 11.7 mmol of t-butyl-methyldimethoxysilane was used instead of t-butyl-n-propyldimethoxysilane used as the reactant (viii) in Example 27(a) for the preparation of the catalyst component (A). Using the catalyst component (A) thus obtained, polymerization of propylene was conducted under the same conditions as in Example 27(b) except that 0.29 mmol of t-butyl-methyldimethoxysilane was used instead of t-butyl-n-propyldimethoxysilane used as the catalyst component (C) in Example 27(b).

As a result, the catalytic activity was found to be 22,700 g/g. Various properties of the polymer particles were measured, whereby MFR was found to be 2.3 g/10 min, $X_Y$ was found to be 1.0%, $Q_W$ was found to be 4.8, the bulk density was found to be 0.48 g/cm$^3$, the average particle size was found to be 1,330 μm, σ was found to be 0.11, and the content of fine particles was found to be 0% by weight. Further, the formed polymer particles were spherical.

COMPARATIVE EXAMPLE 15

Using catalyst component (A) prepared in Comparative Example 11, polymerization of propylene was conducted under the same conditions as in Comparative Example 11 except that no hydrogen was added in Comparative Example 11.

As a result, the catalytic activity was found to be 23,700 g/g. Various properties of the polymer particles were measured, whereby [η] was found to be 3.7 dl/g, $X_Y$ was found to be 1.2%, the bulk density was found to be 0.48 g/cm$^3$, the average particle size was found to be 1,350 μm, σ was found to be 0.11, and the content of fine particles was found to be 0% by weight.

The results of polymerization in Examples 27 to 34 are shown in Table 9, the results of polymerization in Examples 35 to 36 and Comparative Example 15 are shown in Table 10, and the results of polymerization in Comparative Examples 13 to 14 are shown in Table 11.

TABLE 1

| | Catalyst component (C) | Catalitic activity (g/g cata.) | MFR (g/10 min.) | $X_Y$ (%) | Bulk density (g/cm$^3$) | Average particle size (μm) | σ | Content of fine particles (%) | Odor of powder |
|---|---|---|---|---|---|---|---|---|---|
| Example 1 | Isopropyl-n-propyldi-methoxy-silane | 33800 | 1.6 | 0.9 | 0.44 | 6060 | 0.14 | 0 | Nil |
| Example 2 | Isopropyl-n-hexyldi-methoxy-silane | 27800 | 1.3 | 1.0 | 0.45 | 5710 | 0.14 | 0 | Nil |
| Example 3 | Sec-butylethyl-dimethoxy-silane | 32000 | 1.6 | 1.0 | 0.44 | 5900 | 0.14 | 0 | Nil |

TABLE 2

| | Catalyst component (C) | Catalitic activity (g/g cata.) | MFR (g/10 min.) | $X_Y$ (%) | Bulk density (g/cm$^3$) | Average particle size (μm) | σ | Content of fine particles (%) | Odor of powder* |
|---|---|---|---|---|---|---|---|---|---|
| Comparative Example 1 | Diisopropyl-dimethoxy-silane | 5900 | 0.6 | 1.5 | 0.28 | 580 | 0.65 | 20 | Present |
| Comparative Example 2 | Tertiary-butylmethyl-dimethoxy-silane | 5100 | 0.7 | 1.6 | 0.28 | 540 | 0.60 | 18 | Present |
| Comparative Example 3 | Di(tertiary-butyl)di-methoxy-silane | 6900 | 0.5 | 1.5 | 0.29 | 620 | 0.68 | 20 | Present |
| Compara-tive | Diisopropyl- | 6200 | 0.8 | 1.7 | 0.31 | 950 | 0.96 | 25 | Present |

TABLE 2-continued

| | Catalyst component (C) | Catalytic activity (g/g cata.) | MFR (g/10 min.) | $X_Y$ (%) | Bulk density (g/cm³) | Average particle size (μm) | σ | Content of fine particles (%) | Odor of powder* |
|---|---|---|---|---|---|---|---|---|---|
| tive Example 4 | dimethoxy silane | | | | | | | | |
| Comparative Example 5 | Cyclohexyl-methyl-dimethoxy silane | 6100 | 1.9 | 1.9 | 0.31 | 950 | 0.95 | 25 | Present |
| Comparative Example 6 | Di(tertiary-buty)di-methoxy silane | 7100 | 0.7 | 1.7 | 0.31 | 970 | 0.98 | 20 | Present |

*The powder had the same odor as the odor of the stock solution of the catalyst component (C) used, in all the cases.

TABLE 3

| | Catalyst component (C) | Catalytic activity (g/g cata.) | MFR (g/10 min.) | $X_Y$ (%) | Bulk density (g/cm³) | Average particle size (μm) | σ | Content of fine particles (%) | Odor of powder |
|---|---|---|---|---|---|---|---|---|---|
| Example 4 | Tertiary-butyl-n-propyldi-methoxy-silane | 45600 | 1.1 | 0.8 | 0.48 | 1680 | 0.11 | 0 | Nil |
| Example 5 | Tertiary-butyl-n-propyldi-methoxy-silane | 59300 | 1.0 | 0.6 | 0.48 | 2120 | 0.11 | 0 | Nil |
| Example 6 | Tertiary-butyl-n-butyldi-methoxy-silane | 41400 | 1.6 | 0.6 | 0.48 | 1620 | 0.11 | 0 | Nil |
| Example 7 | Tertiary-butyl-n-hexyldi-methoxy-silane | 49700 | 1.5 | 0.5 | 0.48 | 1730 | 0.11 | 0 | Nil |

TABLE 4

| | Catalyst component (C) | Catalytic activity (g/g cata.) | [η] (dl/g) | $X_Y$ (%) | Bulk density (g/cm³) | Average particle size (μm) | σ | Content of fine particles (%) | Odor of powder |
|---|---|---|---|---|---|---|---|---|---|
| Example 8 | Tertiary-butyl-n-propyldi-methoxy-silane | 25700 | 5.1 | 1.0 | 0.47 | 1390 | 0.11 | 0 | Nil |
| Example 9 | Tertiary-butyl-n-butyldi-methoxy-silane | 24500 | 5.0 | 1.0 | 0.47 | 1350 | 0.11 | 0 | Nil |
| Example 10 | Tertiary-butyl-n-hexyldi-methoxy-silane | 37100 | 5.0 | 0.8 | 0.47 | 1560 | 0.11 | 0 | Nil |

TABLE 4

|  | Catalyst component (C) | Catalitic activity (g/g cata.) | [η] (dl/g) | $X_Y$ (%) | Bulk density (g/cm³) | Average particle size (μm) | σ | Content of fine particles (%) | Odor of powder |
|---|---|---|---|---|---|---|---|---|---|
| Example 11 | Tertiary-butyl-i-butyldimethoxysilane | 17400 | 4.6 | 1.5 | 0.46 | 1220 | 0.12 | 0 | Nil |
| Example 12 | Tertiary-butylmethyldimethoxysilane | 15900 | 4.3 | 1.3 | 0.46 | 1180 | 0.12 | 0 | Nil |
| Comparative Example 7 | Diphenyldimethoxysilane | 22500 | 3.7 | 1.2 | 0.47 | 1320 | 0.11 | 0 | Present |
| Comparative Example 8 | Tertiary-butylphenyldimethoxysilane | 17100 | 3.8 | 4.6 | 0.47 | 1200 | 0.11 | 0 | Present |

TABLE 5

|  | Catalitic activity (g/g cata.) | MFR (g/10 min.) | $X_Y$ (%) | $Q_W$ | Bulk density (g/cm³) | Average particle size (μm) | σ | Content of fine particles (%) |
|---|---|---|---|---|---|---|---|---|
| Example 13 | 38700 | 3.4 | 1.2 | 6.5 | 0.48 | 1580 | 0.11 | 0 |
| Example 14 | 53700 | 4.7 | 0.6 | 6.7 | 0.49 | 2100 | 0.11 | 0 |
| Example 15 | 7600 | 1.2 | II99.4 | 6.5 | 0.45 | 1100 | 0.11 | 0 |
| Example 16 | 30600 | 3.1 | 1.0 | 7.0 | 0.48 | 1450 | 0.11 | 0 |
| Example 17 | 18400 | 3.4 | 1.2 | 7.5 | 0.47 | 1200 | 0.12 | 0 |

TABLE 6

|  | Catalitic activity (g/g cata.) | MFR (g/10 min.) | $X_Y$ (%) | $Q_W$ | Bulk density (g/cm³) | Average particle size (μm) | σ | Content of fine particles (%) |
|---|---|---|---|---|---|---|---|---|
| Example 18 | 34300 | 3.4 | 1.0 | 7.4 | 0.48 | 1510 | 0.10 | 0 |
| Example 19 | 31500 | 4.5 | 1.2 | 7.4 | 0.48 | 1420 | 0.11 | 0 |
| Example 20 | 19100 | 4.6 | 1.3 | 7.6 | 0.46 | 1260 | 0.11 | 0 |
| Example 21 | 37300 | 2.6 | 0.7 | 8.1 | 0.48 | 1570 | 0.10 | 0 |
| Example 22 | 34400 | 2.8 | 1.0 | 8.0 | 0.48 | 1520 | 0.10 | 0 |
| Example 23 | 16500 | 3.2 | 1.3 | 8.0 | 0.46 | 1160 | 0.12 | 0 |

TABLE 7

|  | Catalitic activity (g/g cata.) | MFR (g/10 min.) | $X_Y$ (%) | $Q_W$ | Bulk density (g/cm³) | Average particle size (μm) | σ | Content of fine particles (%) |
|---|---|---|---|---|---|---|---|---|
| Example 24 | 37800 | 3.4 | 1.0 | 7.5 | 0.48 | 1550 | 0.10 | 0 |
| Example 25 | 32400 | 2.1 | 1.1 | 7.2 | 0.48 | 1490 | 0.10 | 0 |
| Example 26 | 16700 | 1.3 | 3.5 | 9.7 | 0.45 | 1200 | 0.13 | 0 |

TABLE 8

|  | Catalitic activity (g/g cata.) | MFR (g/10 min.) | $X_Y$ (%) | $Q_W$ | Bulk density (g/cm$^3$) | Average particle size (μm) | σ | Content of fine particles (%) |
|---|---|---|---|---|---|---|---|---|
| Comparative Example 9 | 36000 | 5.0 | 1.0 | 4.9 | 0.48 | 1550 | 0.10 | 0 |
| Comparative Example 10 | 21900 | 3.1 | 1.9 | 5.6 | 0.48 | 1300 | 0.10 | 0 |
| Comparative Example 11 | 35200 | 4.5 | 1.1 | 4.5 | 0.48 | 1520 | 0.10 | 0 |
| Comparative Example 12 | 14500 | 6.0 | 3.5 | 7.0 | 0.45 | 1120 | 0.13 | 0 |

TABLE 9

|  | Catalitic activity (g/g cata.) | MFR (g/10 min.) | $X_Y$ (%) | $Q_W$ | Bulk density (g/cm$^3$) | Average particle size (μm) | σ | Content of fine particles (%) |
|---|---|---|---|---|---|---|---|---|
| Example 27 | 44100 | 1.6 | 1.0 | 6.0 | 0.49 | 1660 | 0.11 | 0 |
| Example 28 | 56600 | 1.2 | 0.5 | 6.2 | 0.49 | 2120 | 0.11 | 0 |
| Example 29 | 8200 | 1.1 | II99.5 | 6.0 | 0.45 | 1140 | 0.12 | 0 |
| Example 30 | 48500 | 1.3 | 0.8 | 6.0 | 0.49 | 1700 | 0.11 | 0 |
| Example 31 | 42800 | 1.7 | 0.6 | 6.3 | 0.49 | 1630 | 0.11 | 0 |
| Example 32 | 45000 | 1.6 | 0.7 | 6.5 | 0.49 | 1660 | 0.11 | 0 |
| Example 33 | 47100 | 1.4 | 1.1 | 6.5 | 0.49 | 1700 | 0.11 | 0 |
| Example 34 | 43000 | 1.6 | 1.0 | 6.2 | 0.49 | 1650 | 0.11 | 0 |

TABLE 10

|  | Catalitic activity (g/g cata.) | [η] (dl/g) | $X_Y$ (%) | Bulk density (g/cm$^3$) | Average particle size (μm) | σ | Content of fine particles (%) |
|---|---|---|---|---|---|---|---|
| Example 35 | 27200 | 5.5 | 1.1 | 0.48 | 1420 | 0.11 | 0 |
| Example 36 | 22800 | 5.1 | 1.1 | 0.48 | 1330 | 0.11 | 0 |
| Comparative Example 15 | 23700 | 3.7 | 1.2 | 0.48 | 1350 | 0.11 | 0 |

TABLE 11

|  | Catalitic activity (g/g cata.) | MFR (g/10 min.) | $X_Y$ (%) | $Q_W$ | Bulk density (g/cm$^3$) | Average particle size (μm) | σ | Content of fine particles (%) |
|---|---|---|---|---|---|---|---|---|
| Comparative Example 13 | 36000 | 5.0 | 1.0 | 4.9 | 0.48 | 1550 | 0.10 | 0 |
| Comparative Example 14 | 22700 | 2.3 | 1.0 | 4.8 | 0.48 | 1330 | 0.11 | 0 |

The first effect of the present invention is such that the molecular weight and molecular weight distribution of polymer can be controlled readily. Particularly, when the oxygen-containing organic compound of silicon represented by the formula t-Bu(R$^1$)Si(OR$^2$)$_2$ is used by contacting and reacting it with the solid catalyst component and/or adding it to the polymerization system, it is possible to produce in good yield a polymer having a high molecular weight and a wide molecular weight distribution as compared with conventional magnesium halide carrying-type catalysts, and also to produce a polymer having a high stiffness because the formed polymer has an extremely high stereospecificity.

The second effect is such that it is possible to obtain polymer particles having a high bulk density and an average particle size of a desired level with little fine particles, particularly polymer particles of a pellet size with a particle diameter of a few mm, thus presenting excellent powder properties. This is particularly effective when applied to a gas phase polymerization. Further, it is also possible to obtain polymer particles having a very narrow particle size distribution. Accordingly, in the polymerization step, formation of a deposition within the polymerization reactor can be prevented. Particularly in a slurry polymerization, the separation and filtration of the polymer slurry in the separation and drying steps of the polymer can be facilitated, scattering of fine particles of the polymer out of the system can be prevented, and the drying efficiency will be improved due to the improvement in the flowability. Further, in the transfer step, no bridging will form in the silo, and there will be no trouble in the transfer.

The third effect is such that when an oxygen-containing organic compound of silicon which has no aromatic group is used, the formed powder will have no odor due to the aromatic group, and no aromatic compound will remain in the formed powder.

The fourth effect is such that the polymerization activities are very high, and it is possible to obtain a polymer which does not require a deashing step intended to remove the catalyst residue. By virtue of the high activities, the product will be free from coloring, and no purification of the polymer will be required, such being economically very advantageous.

The fifth effect is such that the stereospecificity of the polymer is excellent. Accordingly, the method is very advantageous for the production of a polymer by a gas phase polymerization method using no reaction medium.

We claim:

1. A method for producing a stereospecific polyolefin comprising homopolymerizing or copolymerizing an $\alpha$-olefin in the presence of a catalyst comprising a transition metal compound and an organometallic compound, wherein said catalyst comprises:

(A) a catalyst component prepared by reacting a homogeneous solution containing
  (i) metal magnesium and 2-ethylhexanol and
  (ii) tris-i-propoxyaluminum and
  (iii) titanium tetra-n-butoxide, with
  (iv) isobutyl aluminum dichloride to obtain a solid product, and further reacting with this solid product
  (v) diisobutyl phthalate or ethyl benzoate and
  (vi) titanium tetrachloride to obtain a solid catalyst component, and further reacting with this solid catalyst component
  (vii) triethyl aluminum or diethyl zinc or ethylbutyl magnesium and
  (viii) an oxygen-containing organic compound of silicon of the formula t-Bu(n-Pr)Si(OMe)$_2$, t-Bu(n-Bu)Si(OMe)$_2$ or t-Bu(n-hexyl)Si(OMe)$_2$, (B) triethyl aluminum (C) an electron-donative compound selected from the group consisting of diphenyldimethoxysilane, diisobutyldimethoxysilane, n-propyltrimethoxysilane, and p-ethoxyethyl benzoate.

2. The method according to claim 1, wherein, prior to the catalytic reaction of the solid catalyst component with the reactants (vii) and (viii), triethyl aluminum is added to the solid catalyst components in an amount of from 0.001 to 200 mol per gram atom of the transition metal of the solid catalyst component, and propylene is prepolymerized in an amount of from 0.1 to 500 g per g of the solid catalyst component.

* * * * *